US008385231B2

(12) United States Patent
Rojas-Cessa et al.

(10) Patent No.: US 8,385,231 B2
(45) Date of Patent: Feb. 26, 2013

(54) DISSEMINATING LINK STATE INFORMATION TO NODES OF A NETWORK

(76) Inventors: Roberto Rojas-Cessa, Brooklyn, NY (US); Nirwan Ansari, Montville, NJ (US); Zhen Qin, Newark, NJ (US)

( * ) Notice: Subject to any disclaimer, the term of this patent is extended or adjusted under 35 U.S.C. 154(b) by 809 days.

(21) Appl. No.: 12/512,635

(22) Filed: Jul. 30, 2009

(65) Prior Publication Data

US 2011/0026437 A1 Feb. 3, 2011

(51) Int. Cl.
*H04L 12/28* (2006.01)

(52) U.S. Cl. ........................................ 370/256; 370/408

(58) Field of Classification Search ........................ None
See application file for complete search history.

(56) References Cited

U.S. PATENT DOCUMENTS

| | | | | |
|---|---|---|---|---|
| 6,363,319 | B1 | 3/2002 | Hsu | |
| 6,650,626 | B1 * | 11/2003 | Cain | 370/256 |
| 7,177,295 | B1 | 2/2007 | Sholander et al. | |
| 8,259,569 | B2 * | 9/2012 | Banerjee et al. | 370/230 |
| 2003/0046390 | A1 * | 3/2003 | Ball et al. | 709/224 |
| 2005/0038909 | A1 * | 2/2005 | Yoshiba et al. | 709/241 |
| 2005/0078656 | A1 * | 4/2005 | Bryant et al. | 370/351 |
| 2005/0083949 | A1 * | 4/2005 | Dobbins et al. | 370/395.53 |
| 2005/0105905 | A1 | 5/2005 | Ovadia et al. | |
| 2005/0254448 | A1 | 11/2005 | Tang et al. | |
| 2007/0041326 | A1 * | 2/2007 | Babiarz et al. | 370/237 |
| 2007/0127396 | A1 * | 6/2007 | Jain et al. | 370/254 |
| 2008/0107027 | A1 * | 5/2008 | Allan et al. | 370/235 |
| 2009/0022069 | A1 * | 1/2009 | Khan et al. | 370/256 |
| 2010/0074101 | A1 * | 3/2010 | Skalecki et al. | 370/221 |

FOREIGN PATENT DOCUMENTS

| | | | |
|---|---|---|---|
| WO | 2004111775 | A2 | 12/2004 |
| WO | 2008097221 | A1 | 8/2008 |

OTHER PUBLICATIONS

G. Apostolopoulos et al., QoS Routing Mechanisms and OSPF Extensions, The Internet Engineering Task Force, RFC2676, 1999.
Zhen Qin, et al., OSPF-Based Adaptive and Flexible Security-Enhanced QoS Provisioning, IEEE Sarnoff Symposium 2006, Mar. 26-28, 2006, Princeton, New Jersey, USA.
J. Moy, OSPF Verson 2, The Internet Engineering Task Force, RFC2328, 1998.
G. Apostolopoulos, et al., Quality of Service Based Routing: A Performance Perspective, ACM SIGCOMM Computer Comm. Review, vol. 28 Is. 4, pp. 17-28, 1998.
J. Moy, Flooding Over a Subset Topology, The Internet Engineering Task Force, Feb. 2001.
Bhargav Bellur, et al., A Reliable, Efficient Topology Broadcast Protocol for Dynamic Networks, IEEE 18th Annual INFOCOM, vol. 1, pp. 178-186, Mar. 21-25, 1999, USA.
Nirwan Ansari, et al., Efficient and Reliable Link State Information Dissemination, IEEE Communication Letters, vol. 8, Is. 5, pp. 317-319, May 2004.
Shaikh, A., et al., "Evaluating the Impact of State Link State on Quality of Service Routing," IEEE/ACM Transactions on Networking, Apr. 2001, vol. 9, No. 2.
International Search Report and Written Opinion mailed on Jul. 30, 2010 for International Application No. PCT/US2010/038151.

* cited by examiner

*Primary Examiner* — Phirin Sam

(57) ABSTRACT

Techniques are generally disclosed for disseminating link state information to one or more nodes of a network of nodes, the network of nodes interconnected via a plurality of communication channels.

23 Claims, 16 Drawing Sheets

Table 300

| Outgoing Link | QoS Parameter | Previous QoS State | Current QoS State |
|---|---|---|---|
| 111a | Delay | N/A | 21 ms |
| | Avail. BW | N/A | 105 Mbs |
| | Packet Loss | N/A | 0.04 |
| | Sec. Requirement | N/A | 128-bit |
| 112a | Delay | N/Å | 1.5 ms |
| | Avail. BW | N/A | 200 Mbs |
| | Packet Loss | N/A | 0.05 |
| | Sec. Requirement | N/A | 32-bit |
| 141b | Delay | N/A | 25 ms |
| | Avail. BW | N/A | 1 Mbs |
| | Packet Loss | N/A | 1.2 |
| | Sec. Requirement | N/A | 32-bit |

FIG. 3

Packet Format 400

| Node ID 410 | Link ID 420 | Delay 430 | Avail. BW 440 | Packet Loss 450 | Security 460 | Type 470 |
|---|---|---|---|---|---|---|

FIG. 4

Table 500

| | | | Delay Wt. = 2 | | Avail. BW Wt. = 1.5 | | Packet Loss Wt. = 1 | | Sec. Requirement Wt. = 0.5 | | Total Score |
|---|---|---|---|---|---|---|---|---|---|---|---|
| Comm. Channel | Outgoing Link | Node ID | Class Supported | Score | Class Supported | Score | Class Supported | Score | Class Supported | Score | |
| 111 | 111a | 110 | 3 | 6 | 1 | 1.5 | 3 | 3 | 3 | 1.5 | 12 |
| | 111b | 160 | 2 | 4 | 1 | 1.5 | 2 | 2 | 3 | 1.5 | 9 |
| 112 | 112a | 110 | 1 | 2 | 1 | 1.5 | 2 | 2 | 2 | 1 | 6.5 |
| | 112b | 120 | 1 | 2 | 2 | 3 | 2 | 2 | 2 | 1 | 8 |
| 121 | 121a | 120 | 1 | 2 | 1 | 1.5 | 1 | 1 | 1 | 0.5 | 5 |
| | 121b | 160 | 2 | 4 | 1 | 1.5 | 1 | 1 | 1 | 0.5 | 7 |
| 122 | 122a | 120 | 1 | 2 | 1 | 1.5 | 1 | 1 | 1 | 0.5 | 5 |
| | 122b | 130 | 1 | 2 | 1 | 1.5 | 2 | 2 | 1 | 0.5 | 6 |
| 123 | 123a | 120 | 1 | 2 | 1 | 1.5 | 2 | 2 | 1 | 0.5 | 6 |
| | 123b | 140 | 1 | 2 | 1 | 1.5 | 2 | 2 | 2 | 1 | 6.5 |
| 131 | 131a | 130 | 1 | 2 | 1 | 1.5 | 1 | 1 | 1 | 0.5 | 5 |
| | 131b | 150 | 2 | 4 | 1 | 1.5 | 3 | 3 | 2 | 1 | 9.5 |
| 141 | 141a | 140 | 3 | 6 | 2 | 3 | 3 | 3 | 2 | 1 | 19 |
| | 141b | 110 | 4 | 8 | 4 | 6 | 4 | 4 | 2 | 1 | 13 |
| 151 | 151a | 150 | 1 | 2 | 1 | 1.5 | 1 | 1 | 2 | 1 | 5.5 |
| | 151b | 140 | 2 | 4 | 2 | 3 | 2 | 2 | 2 | 1 | 10 |
| 161 | 161a | 160 | 1 | 2 | 2 | 3 | 1 | 1 | 1 | 0.5 | 6.5 |
| | 161b | 130 | 1 | 2 | 1 | 1.5 | 1 | 1 | 1 | 0.5 | 5 |

FIG. 5

Table 700

| Outgoing Link | QoS Parameter | Previous QoS State | Current QoS State |
|---|---|---|---|
| 111a | Delay | 21 ms | 1 ms |
| | Avail. BW | 105 Mbs | 105 Mbs |
| | Packet Loss | 0.04 | 0.009 |
| | Sec. Requirement | 64-bit | No Security |
| 112a | Delay | 1.5 ms | 21 ms |
| | Avail. BW | 200 Mbs | 200 Mbs |
| | Packet Loss | 0.05 | 0.05 |
| | Sec. Requirement | 32-bit | 32-bit |
| 141b | Delay | 25 ms | 25 ms |
| | Avail. BW | 1 Mbs | 1 Mbs |
| | Packet Loss | 1.2 | 1.2 |
| | Sec. Requirement | 32-bit | 32-bit |

FIG. 7

Table 800

| | | | Delay Wt. = 2 | | Avail. BW Wt. = 1.5 | | Packet Loss Wt. = 1 | | Sec. Requirement Wt. = 0.5 | | Total Score |
|---|---|---|---|---|---|---|---|---|---|---|---|
| Comm. Channel | Outgoing Link | Node ID | Class Supported | Score | Class Supported | Score | Class Supported | Score | Class Supported | Score | |
| 111 | 111a | 110 | 1 | 2 | 1 | 1.5 | 1 | 1 | 1 | 0.5 | 5 |
| | 111b | 160 | 2 | 4 | 1 | 1.5 | 2 | 2 | 3 | 1.5 | 9 |
| 112 | 112a | 110 | 3 | 6 | 1 | 1.5 | 2 | 2 | 2 | 1 | 10.5 |
| | 112b | 120 | 1 | 2 | 2 | 3 | 2 | 2 | 2 | 1 | 8 |
| 121 | 121a | 120 | 1 | 2 | 1 | 1.5 | 1 | 1 | 1 | 0.5 | 5 |
| | 121b | 160 | 2 | 4 | 1 | 1.5 | 1 | 1 | 1 | 0.5 | 7 |
| 122 | 122a | 120 | 1 | 2 | 1 | 1.5 | 1 | 1 | 1 | 0.5 | 5 |
| | 122b | 130 | 1 | 2 | 1 | 1.5 | 2 | 2 | 1 | 0.5 | 6 |
| 123 | 123a | 120 | 1 | 2 | 1 | 1.5 | 2 | 2 | 1 | 0.5 | 6 |
| | 123b | 140 | 1 | 2 | 1 | 1.5 | 2 | 2 | 2 | 1 | 6.5 |
| 131 | 131a | 130 | 1 | 2 | 1 | 1.5 | 1 | 1 | 1 | 0.5 | 5 |
| | 131b | 150 | 2 | 4 | 1 | 1.5 | 3 | 3 | 2 | 1 | 9.5 |
| 141 | 141a | 140 | 3 | 6 | 2 | 3 | 3 | 3 | 2 | 1 | 19 |
| | 141b | 110 | 4 | 8 | 4 | 6 | 4 | 4 | 2 | 1 | 13 |
| 151 | 151a | 150 | 1 | 2 | 1 | 1.5 | 1 | 1 | 2 | 1 | 5.5 |
| | 151b | 140 | 2 | 4 | 2 | 3 | 2 | 2 | 2 | 1 | 10 |
| 161 | 161a | 160 | 1 | 2 | 2 | 3 | 1 | 1 | 1 | 0.5 | 6.5 |
| | 161b | 130 | 1 | 2 | 1 | 1.5 | 1 | 1 | 1 | 0.5 | 5 |

FIG. 8

Table 1000

| Outgoing Link | QoS Parameter | Previous QoS State | Current QoS State |
|---|---|---|---|
| 121a | Delay | 1 ms | 1 ms |
| | Avail. BW | 300 Mbs | 300 Mbs |
| | Packet Loss | 0.0095 | 0.0095 |
| | Sec. Requirement | No Security | No Security |
| 122a | Delay | 1.5 ms | 1.5 ms |
| | Avail. BW | 150 Mbs | 150 Mbs |
| | Packet Loss | 0.0098 | 0.0098 |
| | Sec. Requirement | No Security | No Security |
| 123a | Delay | 1.5 ms | 25 ms |
| | Avail. BW | 200 Mbs | 1 Mbs |
| | Packet Loss | 0.009 | 1.1 |
| | Sec. Requirement | No Security | 128-bit |
| 112b | Delay | 1 ms | 1 ms |
| | Avail. BW | 50 Mbs | 50 Mbs |
| | Packet Loss | 0.04 | 0.04 |
| | Sec. Requirement | 32-bit | 32-bit |

FIG. 10

Table 1100

| | | | Delay Wt. = 2 | | Avail. BW Wt. = 1.5 | | Packet Loss Wt. = 1 | | Sec. Requirement Wt. = 0.5 | | Total Score |
|---|---|---|---|---|---|---|---|---|---|---|---|
| Comm. Channel | Outgoing Link | Node ID | Class Supported | Score | Class Supported | Score | Class Supported | Score | Class Supported | Score | |
| 111 | 111a | 110 | 2 | 6 | 1 | 1.5 | 3 | 3 | 3 | 1.5 | 5 |
| | 111b | 160 | 2 | 4 | 1 | 1.5 | 2 | 2 | 3 | 1.5 | 9 |
| 112 | 112a | 110 | 1 | 2 | 1 | 1.5 | 2 | 2 | 2 | 1 | 10.5 |
| | 112b | 120 | 1 | 2 | 2 | 3 | 2 | 2 | 2 | 1 | 8 |
| 121 | 121a | 120 | 1 | 2 | 1 | 1.5 | 1 | 1 | 1 | 0.5 | 5 |
| | 121b | 160 | 2 | 4 | 1 | 1.5 | 1 | 1 | 1 | 0.5 | 7 |
| 122 | 122a | 120 | 1 | 2 | 1 | 1.5 | 1 | 1 | 1 | 0.5 | 5 |
| | 122b | 130 | 1 | 2 | 1 | 1.5 | 2 | 2 | 1 | 0.5 | 6 |
| 123 | 123a | 120 | 4 | 8 | 4 | 6 | 4 | 4 | 2 | 2 | 20 |
| | 123b | 140 | 1 | 2 | 1 | 1.5 | 2 | 2 | 2 | 1 | 6.5 |
| 131 | 131a | 130 | 1 | 2 | 1 | 1.5 | 1 | 1 | 1 | 0.5 | 5 |
| | 131b | 150 | 2 | 4 | 1 | 1.5 | 3 | 3 | 2 | 1 | 9.5 |
| 141 | 141a | 140 | 3 | 6 | 2 | 3 | 3 | 3 | 2 | 1 | 19 |
| | 141b | 110 | 4 | 8 | 4 | 6 | 4 | 4 | 2 | 1 | 13 |
| 151 | 151a | 150 | 1 | 2 | 1 | 1.5 | 1 | 1 | 2 | 1 | 5.5 |
| | 151b | 140 | 2 | 4 | 2 | 3 | 2 | 2 | 2 | 1 | 10 |
| 161 | 161a | 160 | 1 | 2 | 2 | 3 | 1 | 1 | 1 | 0.5 | 6.5 |
| | 161b | 130 | 1 | 2 | 1 | 1.5 | 1 | 1 | 1 | 0.5 | 5 |

FIG. 11

1600 A computer program product.

1602 A signal bearing medium.

1604 Instructions for disseminating link state information to one or more nodes of a network of nodes, the network of nodes interconnected via a plurality of communication channels, the instructions, which, when executed by logic, cause the logic to:

forward to the network of nodes link state information for an outgoing link of the node;

receive from the network of nodes link state information for a plurality of outgoing links of the the network of nodes;

build a link state matrix based on the link state information for the outgoing link and also based on the link state information for the plurality of outgoing links;

generate a spanning tree based on the link state matrix;

determine whether a threshold for a quality of service (QoS) state associated with the outgoing link has been reached;

update the link state matrix and update the spanning tree in response to a determination of the threshold being reached; or disseminate updated link state information for the outgoing link based on the updated spanning tree, the updated link state information to indicate a change in the QoS state associated with the outgoing link.

1606 a computer-readable medium.

1608 a recordable medium.

1610 a communications medium.

FIG. 16

DISSEMINATING LINK STATE INFORMATION TO NODES OF A NETWORK

BACKGROUND

Unless otherwise indicated herein, the approaches described in this section are not prior art to the claims in this application and are not admitted to be prior art by inclusion in this section.

Communication networks may require Quality-of-Service (QoS) provisioning for forwarding of data between routers (herein referred to as "nodes") interconnected via communication channels. A process known as QoS routing may be used to find a path or route through a network of interconnected nodes that may meet minimum QoS requirements associated with data to be forwarded through the network of interconnected nodes. QoS routing may be based on a QoS state of separate outgoing links of communication channels coupling nodes of the network. The QoS state may indicate a capability of an outgoing link to meet at least minimum QoS requirements. For example, a minimum QoS requirement may include a minimum threshold for available bandwidth at an outgoing link of a communication channel coupled to a node.

Various QoS routing schemes have been developed that depend on timely awareness of QoS link states for the outgoing links included in a given QoS route through a network of nodes. These QoS routing schemes may allow nodes to forward packets of data according to a QoS link state (e.g., available bandwidth) at each hop or outgoing link of a node along the QoS route that may satisfy at least a minimum end-to-end QoS requirement for the QoS route. Dissemination mechanisms to convey timely or updated link state information to interconnected nodes may include flooding link-states advertisement (LSA) packets. Flooding LSA packets may include each node sending or forwarding its own LSA packet and forwarding those LSA packets created by other nodes until all nodes in the network have a current or updated knowledge of each node's QoS link states for their respective outgoing links. Once nodes receive updates of the QoS link states, the QoS route may be updated and/or changed to reflect the current QoS link states.

Dissemination mechanisms based on flooding LSA packets may generate a significant dissemination overhead. The dissemination overhead may continue to increase as additional minimum QoS requirements (e.g., packet loss rates, delay, security, etc.) may be added to forward packets of data via a QoS route. Also, link state information may become stale or out-of-date by the time all nodes in a network receive an update LSA packet via flooding. This staleness may be due to network congestion at the time of the flooding or due to other types of network performance issues (e.g., broken/malfunctioning communication channels). Further, to minimize the impacts of dissemination overhead on the performance of the network, update frequencies may be extended to time intervals of 30 minutes or more. However, extended update intervals may also lead to stale or out-of-date link state information.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 3 illustrates an example table for link state information for a node;

FIG. 4 illustrates an example packet format for a link state advertisement (LSA);

FIG. 5 illustrates an example table for a link state matrix for a network of nodes;

FIG. 7 illustrates an example table for link state information for a node following initiation of a spanning tree;

FIG. 8 illustrates an example table for an updated link state matrix for a network of nodes;

FIG. 10 illustrates an example table for link state information for a child node following receipt of link state information from a parent node of a spanning tree;

FIG. 11 illustrates an example table for an updated link state matrix for a network of nodes;

FIG. 16 illustrates a block diagram of an example computer program product.

DETAILED DESCRIPTION

Figure 1:
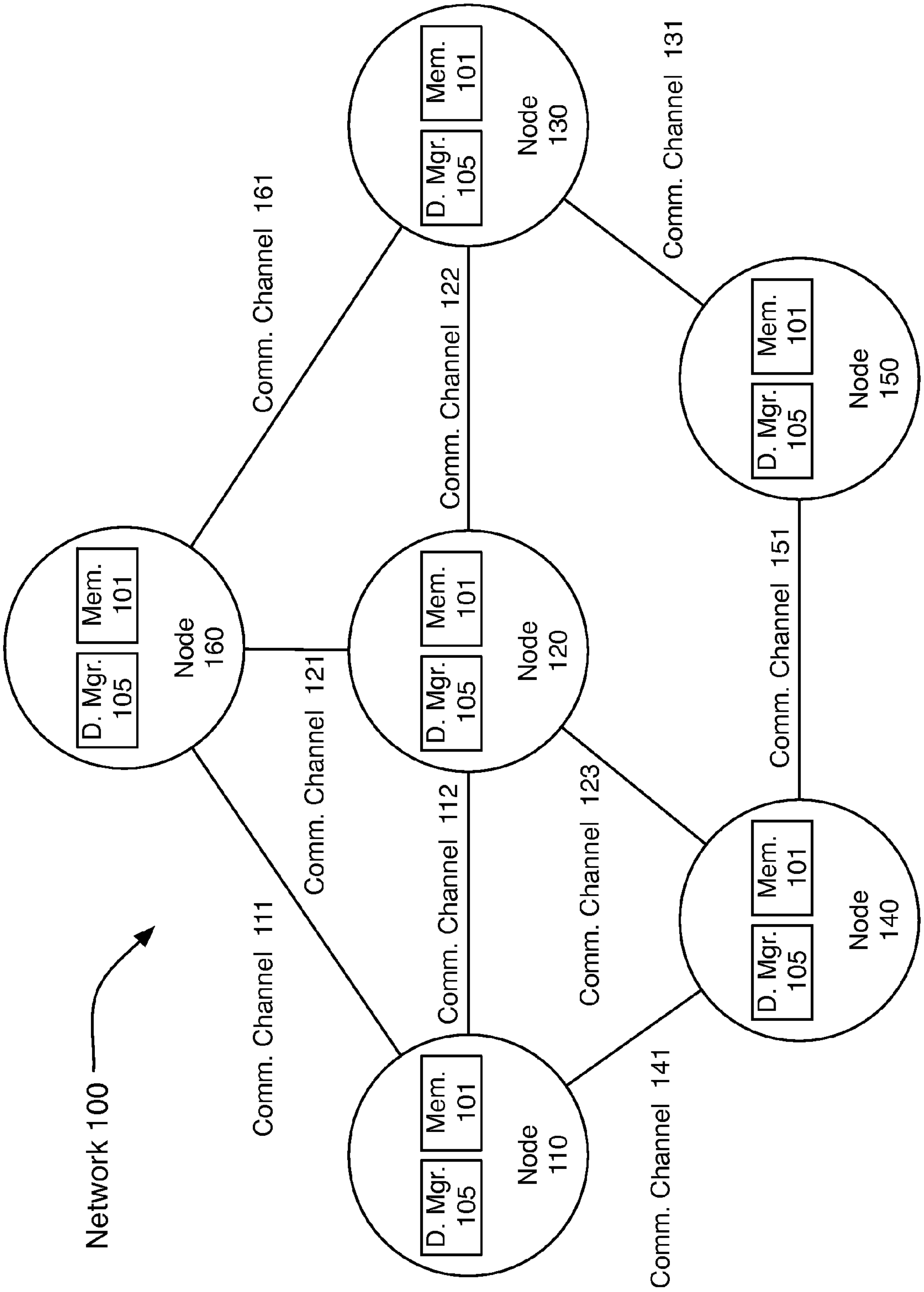
FIG. 1 illustrates an example network of nodes.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products related to disseminating link state information to nodes of a network.

As contemplated in the present disclosure, dissemination mechanisms based on flooding LSA packets to disseminate link state information may generate a significant dissemination overhead. Also, staleness due to congestion, network performance issues or extended update intervals may also be problematic to the timely dissemination of link state information. Possible ways to address dissemination overhead and staleness of information might include a localized flooding approach. A localized flooding approach may include a dissemination mechanism based on a spanning tree scheme instead of flooding the entire network with LSA packets. The spanning tree scheme may include use of a protocol called Topology Broadcast, based on Reverse Path Forwarding (TBRPF). The TBRPF protocol may enable nodes to use reverse path forwarding to exchange LSA packets through an established/built spanning tree. Once all nodes in the spanning tree receive separate LSA packets from each of the nodes included in the spanning tree, the spanning tree may be adjusted or updated.

A spanning tree scheme using a TBRPF protocol may not timely account for QoS link state changes for separate communication links between nodes. A lack of timeliness for receiving QoS link state changes may be the result of all nodes needing to receive separate LSA packets for each node in the spanning tree before the spanning tree can be adjusted or updated. Further, outgoing link failures or performance constraints (e.g., excessive delay) at an outgoing link of a communication channel between nodes included in a spanning tree may either delay updates or possibly isolate a node coupled to the failed outgoing link. The isolated node may then either receive stale link state information or may not be able to receive link state information at all. As a result of being isolated, the spanning tree may have to be rebuilt to reach the node and rebuilding the spanning tree may require the entire network to be flooded with LSA packets. Thus, a spanning tree scheme that does not timely account for QoS link state changes for separate outgoing links of communication channels between nodes and does not account for a possibility of an outgoing link failure may be problematic to timely dissemination of link state information between nodes of a network.

In some examples, methods are implemented for disseminating link state information to nodes of a network interconnected via a plurality of communication channels. These example methods may include forwarding to the network of nodes link state information for an outgoing link of the node and receiving from the network of nodes link state information for a plurality of outgoing links of the network of nodes. A link state matrix may then be built based on the link state information for the outgoing link and also based on the link state information for the plurality of outgoing links. Also, a spanning tree based on the link state matrix may be generated. Further, a determination may be made of whether a threshold for a quality of service (QoS) state associated with the outgoing link has been reached. Responsive to a determination of the threshold being reached, the link state matrix and the spanning tree may be updated. The updated link state information for the outgoing link may be disseminated based on the updated spanning tree. The updated link state information for the outgoing link, for example, may indicate a change in the QoS state associated with the outgoing link.

FIG. 1 illustrates an example network of nodes arranged in accordance with the present disclosure. As shown in FIG. 1, the network of nodes includes network 100 having one or more nodes 110, 120, 130, 140, 150 and/or 160. These nodes may be interconnected via a plurality of communication channels. As shown in FIG. 1, these communication channels may include 111, 112, 121, 122, 123, 131, 141, 151 and/or 161. Also, as described in more detail below, nodes 110, 120, 130, 140, 150 and 160 may each include a memory 101 and a dissemination manager 105. As described more below, memory 101 may be arranged to store a link state matrix and store a spanning tree generated based on the link state matrix. Also described more below, dissemination manager 105 may be configured to disseminate link state information to one or more nodes of network 100 for the nodes to build or update a link state matrix and build, update or adjust a spanning tree.

In some examples, one or more of nodes 110, 120, 130, 140, 150 and/or 160 may be routers for a wired and/or wireless communication network. These routers/nodes may be configured to operate in accordance with various communication protocols or standards from such organizations as the Institute for Electrical Electronic Engineers (IEEE) (e.g., IEEE 802.X standards), the Internet Engineering Task Fork (IETF) (e.g., IPv4, IPv6), the International Telecommunications Union (ITU) (e.g., OC-192) or from other organizations that may publish protocols or standards for communication networks. The communication protocols or standards may be used by the nodes of network 100 to forward data via one or more of communication channels 111, 112, 121, 122, 123, 131, 141, 151 and/or 161 using wireless and/or wired forms of transmission media.

In some examples, data may be routed between the nodes of network 100 via a path or route that attempts to meet minimum QoS requirements. For example, one or more of the above-mentioned standards or protocols may dictate or require that minimum QoS requirements are met to forward data. Minimum QoS requirements may also be dictated by commitments or obligations made by administrators, managers or operators of network 100 to users of network 100. These minimum QoS requirements may include, but are not limited to, one or more operating or QoS parameters such as delay, available bandwidth, packet loss and/or security requirement. The QoS parameters may be further divided into separate subgroups or classes of service. Table 1, shown below, shows examples of four QoS parameters and classes of service separately associated with the four QoS parameters, although this disclosure is not limited to only these four QoS parameters and four classes of service. Note that a 128-bit encryption data block may be classified as a class 4 because the larger the required encryption block, the greater the impact on the outgoing links of a communication channel as a node attempts to meet security requirements associated with the larger encryption data block.

TABLE 1

| QoS Parameter | Class 1 | Class 2 | Class 3 | Class 4 |
|---|---|---|---|---|
| Delay milliseconds (ms) | $<2$ | $2 \leqq \text{delay} < 10$ | $10 \leqq \text{delay} < 20$ | $\geqq 20$ |
| Avail. Bandwidth (BW) megabit/second (Mbit/s) | $>100$ | $100 \geqq \text{BW} > 10$ | $10 \geqq \text{BW} > 2$ | $\leqq 2$ |
| Packet Loss per 1,000 Packets Transmitted | $<0.01$ | $0.01 \leqq \text{loss} < 0.1$ | $0.1 \leqq \text{loss} < 1$ | $\geqq 1$ |
| Security requirement | No security | 32-bit | 64-bit | 128-bit |

In some examples, a QoS routing scheme may be used to find a path or route through network 100 that may allow data to be forwarded through network 100 in a manner that at least meets service class requirements or commitments associated with one or more of the QoS parameters shown in Table 1. In order to establish and determine an acceptable QoS route through network 100, the nodes of network 100 may be configured to disseminate link state information (e.g., via LSA packets) for communication channels interconnecting the nodes of network 100. The disseminated link state information may include a QoS state for one or more of the QoS parameters (e.g., delay, avail. BW, packet loss, security requirement, etc.). A QoS state may be associated with an outgoing link of a given communication channel (e.g., communication channel 111) and may indicate whether data forwarded from a given node (e.g., node 110) via the given communication channel has an ability to meet service class requirements or commitments associated with one or more of the QoS parameters shown in Table 1.

In some examples, as described more below, one or more nodes of network 100 may be configured to build or generate a link state matrix that includes a compilation of link state information received from other nodes of network 100 and at least temporarily store the link state matrix in a memory 101 separately maintained at the one or more nodes. The link state matrix may include one or more QoS states associated with outgoing links of the various communication channels interconnecting the nodes of network 100. Based on the link state matrix, the one or more nodes may then formulate or generate a QoS route for forwarding data between nodes of network 100. A generated QoS route that was generated based on a link state matrix may also include the generation of a spanning tree that may also be stored in a node's memory 101. As described more below, the spanning tree may be used to disseminate link state information between the nodes included in the spanning tree.

In some examples, dissemination managers 105 at nodes that are part of a spanning tree may be configured to monitor QoS states associated with outgoing links of communication channels that are also part of the spanning tree. These dissemination managers 105 may be further configured to determine whether a threshold for the QoS state has been reached. For example, a threshold may be whether an available bandwidth at an outgoing link of a communication channel has dropped below a specified level such that data forwarded from a node via the outgoing link may not meet service class requirements or commitments associated with available bandwidth (see Table 1). In response to the threshold being reached, the detecting node may need to update both its link state matrix and its spanning tree. Also, as described more below, the detecting node may disseminate updated link state information for the outgoing link of the communication channel using the updated spanning tree to determine which nodes to send the updated link state information.

Figure 2:
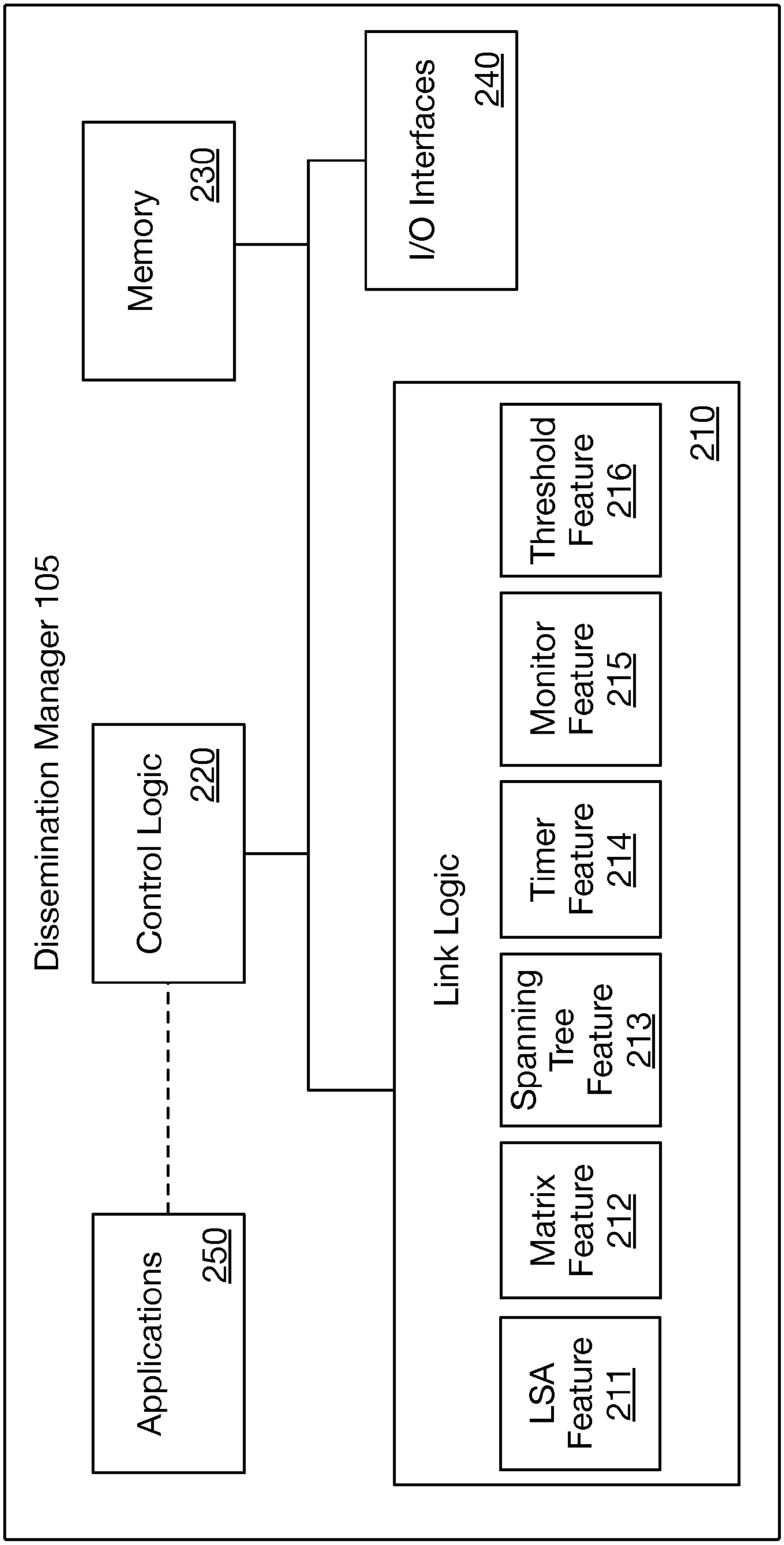
FIG. 2 illustrates a block diagram of an example architecture for a dissemination manager.

FIG. 2 illustrates a block diagram of an example architecture for a dissemination manager 105 arranged in accordance with the present disclosure. As described above for FIG. 1, the nodes of network 100 may separately include dissemination manager 105. In some examples, dissemination manager 105 may include features and/or logic configured or arranged to disseminate link state information to one or more nodes of network 100.

The example dissemination manager 105 of FIG. 2 includes link logic 210, control logic 220, memory 230, input/output (I/O) interfaces 240 and optionally one or more applications 250. As illustrated in FIG. 2, link logic 210 may be coupled to control logic 220, memory 230 and/or I/O interfaces 240. Also illustrated in FIG. 2 the optional applications 250 may be arranged in cooperation with control logic 220. Link logic 210 may further include one or more of an LSA feature 211, a matrix feature 212, a spanning tree feature 213, a timer feature 214, a monitor feature 215 and/or a threshold feature 216.

In some examples, the elements portrayed in FIG. 2's block diagram may be configured to support or enable dissemination manager 105 as described in this disclosure. A given Dissemination manager 105 may include some, all or more elements than those depicted in FIG. 2. For example, link logic 210 and control logic 220 may separately or collectively represent a wide variety of logic device(s) to implement the features of dissemination manager 105. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 2, link logic 210 may include one or more of an LSA feature 211, a matrix feature 212, a spanning tree feature 213, a timer feature 214, a monitor feature 215 and/or a threshold feature 216. Link logic 210 may be configured to use one or more of these features to perform operations. As described in more detail below, example operations may include one or more of disseminating link state information to one or more nodes of network 100.

In some examples, control logic 220 may be configured to control the overall operation of dissemination manager 105. As mentioned above, control logic 220 may represent any of a wide variety of logic device(s) configured to operate in conjunction with executable content to implement the control of dissemination manager 105. In some alternate examples, the features and functionality of control logic 220 may be implemented within link logic 210.

According to some examples, memory 230 may be arranged to store executable content. The executable content may be used by control logic 220 and/or link logic 210 to implement or activate features or elements of dissemination manager 105. Memory 230 may also be arranged to temporarily maintain information for previous or current QoS states associated with outgoing links of communication channels coupled to a node.

Memory 230 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 240 may provide an interface via an internal communication medium or link between dissemination manager 105 and elements resident on or located with a given node of network 100. I/O interfaces 240 may include interfaces that operate according to various communication protocols to communicate over the internal communication link (e.g., Inter-Integrated Circuit ($I^2C$), System Management Bus (SMBus) or Serial Peripheral Interface Bus (SPI)). I/O interfaces 240 may also provide an interface between dissemination manager 105 and elements coupled to the given node of network 100. As mentioned above for FIG. 1, the nodes of network 100 may be interconnected via a plurality of communication links. I/O interfaces 240, for example, include an interface configured to operate according to various communication protocols to allow dissemination manager 105 to communicate over the plurality of communication links (e.g., Ethernet, ATM, IPv4, IPv6, OC-192, etc.).

In some examples, dissemination manager 105 may include one or more applications 250 to provide instructions to control logic 220 and/or link logic 210.

FIG. 3 illustrates an example table 300 for link state information for a node, in accordance with the present disclosure. As shown in FIG. 3, table 300 may include link state information for outgoing links 111*a*, 112*a* and 141*b* of communication channels 111, 112 and 141 coupled to node 110. As described above for FIG. 1, node 110 is coupled to node 160 via communication channel 111, coupled to node 120 via communication channel 112 and coupled to node 140 via communication channel 141. In some examples, dissemination manager 105 at node 110 may be configured to monitor the QoS state of the outgoing links of these communication channels and use the results of the monitoring to create table 300. Dissemination manager 105 at node 110 may at least temporarily store table 300 in a memory (e.g., memory 230 and/or memory 101) maintained at node 110.

In some examples, table 300 may include QoS state information for the four QoS parameters listed above in Table 1. Also, for an example associated with table 300, the previous QoS state information is "N/A" because the link state information is at a point of initiation (e.g., for generating a spanning tree) and the previous QoS state information may not be known or has been reset. As illustrated in FIG. 3, the "current QoS state" column of table 300 shows monitored values for delay, available bandwidth, packet loss and security requirement for outgoing links 111*a*, 112*a* and 141*b*.

FIG. 4 illustrates an example packet format 400 for a link state advertisement (LSA) in accordance with the present disclosure. In some examples, packet format 400 may include one or more of fields 410, 420, 430, 440, 450, 460 and/or 470. These fields, for example, include link state information that may be disseminated to nodes of a network (e.g., network 100). As mentioned above and described in more detail below, an LSA packet may be forwarded from one or more nodes to disseminate link state information to nodes of the network. In some examples, the LSA packets may be in the format of packet format 400. A node that receives the LSA packet in the format of packet format 400 may obtain link state information from the LSA packet and use that information to build or update a link state matrix.

In some examples, field 410 may indicate a node identification (ID) for the node that originated or generated the LSA packet (e.g., node 110 of network 100). Field 420 may indicate one or more IDs for one or more outgoing links of one or more communication channels coupled to the node (e.g., outgoing link 112*a*) for which the node is sending link state information. Fields 430, 440, 450 and/or 460 may include QoS state information associated with the example QoS parameters of delay, available bandwidth (BW) and security requirement, respectively. As mentioned above for Table 1, the example QoS parameters may separately be associated with four classes of services. In some examples, fields 430, 440, 450 and/or 460 may include an indication of what classes are supported for the separate QoS parameters. In other examples, the actual QoS state values (e.g., time value for delay) may be included in fields 430, 440, 450 and/or 460.

In some examples, field 470 may indicate a type of LSA packet. LSA packet types may include, but are not limited to, flood, QoS state update, acknowledgement and fail LSA packet types. A flood LSA packet may be a type of LSA packet that may be used by nodes of a network to disseminate link state information between all nodes of the network. For example, the nodes of network 100 may separately generate and forward a flood LSA packet such that each node of network 100 may separately build or generate a link state matrix based, at least in part, on flood LSA packets received from other nodes.

In some examples, a QoS state update LSA packet may be a type of LSA packet forwarded by a node in order to disseminate updated link state information. The QoS state update LSA packet may be forwarded to nodes included in a possibly updated or adjusted spanning tree. An acknowledgement LSA packet may be a type of LSA packet sent from a node that has received a QoS state update LSA packet. In some examples, the acknowledgement LSA packet indicates to the sending node (e.g., parent node) that the receiving node (e.g., child node) has received the updated link state information and may also indicate updated or current link state information for an outgoing link of the receiving node.

In some examples, a fail LSA packet may be a type of LSA packet sent from a node that has failed to receive an acknowledgement LSA packet from another node in the spanning tree. As described more below, a fail LSA packet may be sent to one or more nodes in the spanning tree (e.g., a parent node) to indicate that the other node may be isolated due to a broken or severely impaired outgoing link/communication channel between the node and the other node. In addition to indicating a failure to receive the acknowledgement LSA packet, the fail LSA packet may also include updated or current link state information for an outgoing link of the node.

FIG. 5 illustrates an example table 500 for a link state matrix for a network of nodes (e.g., network 100) in accordance with the present disclosure. In some examples, table 500 illustrates a link state matrix that was built or generated based on link state information for the communication channels of network 100. Dissemination managers 105 at nodes of network 100 (e.g., node 110) may be arranged to separately maintain a link state matrix similar to table 500 in the node's respective memory 101.

According to some examples, dissemination manager 105 at node 110 may be configured to receive the link state information for the outgoing links of communication links 121, 122, 123, 131, 141, 151 and/161 via flood LSA packets in the format of packet format 400. Dissemination manager 105 at Node 110 may also be configured to obtain link state information for the outgoing links 111*a*, 112*a* and 141*b* of communication links 111, 112 and 141 coupled to node 110. Dissemination manager at node 110 may be further configured to build or generate a link state matrix similar to table 500 based on the received link state information and based on the obtained link state information. Link state matrices at other nodes of network 100 may be built in a similar manner as those nodes receive flood LSA packets and obtain link state information for outgoing links of communication channels coupled to these other nodes.

In some examples, table 500 illustrates an example link state matrix that may include an indication of separate service classes supported by the various outgoing links for the communication channels of network 100. As mentioned above for Table 1, four classes of service may be associated with four QoS parameters. The four example QoS parameters may include delay, available bandwidth, packet loss and security requirement. Further, table 500 may indicate the service class supported by a given outgoing link for the separate QoS parameters. For example, as illustrated in FIG. 5, table 500 indicates that outgoing link 121*a* supports class 1 for all four of the QoS parameters and table 500 also indicates the outgoing link 141*a* does not support class 1 for any of the four QoS parameters.

In some examples, a weight value may be associated with a QoS parameter. The weight value may reflect the relative importance of the QoS parameter as compared with other QoS parameters. For example, a higher weight value associated with a QoS parameter may indicate that meeting the QoS parameter is of higher relative importance compared to meeting other QoS parameters. As illustrated in FIG. 5, table 500 includes weight values of 2, 1.5, 1 and 0.5 for delay, available bandwidth, packet loss and security requirement, respectively. Thus, the higher weight value for delay may indicate that meeting minimum QoS requirements associated with delay may result in delay being the most important of the four QoS parameters.

In some examples, as described in more detail below, a weight value may be multiplied by the class supported by a link to establish a separate score for each QoS parameter and a total QoS state score for a given outgoing link. For example, table 500 indicates that outgoing link 112*a* has scores of 2 for delay, 1.5 for available bandwidth, 2 for packet loss and 1 for security requirement. Table 500 further shows a total QoS state score of 6.5 for outgoing link 112*a*. In some examples, the higher the score, the less likely minimum QoS requirements may be met and the less desirable that outgoing link may be for selection as part of a QoS route and/or spanning tree.

Figure 6:
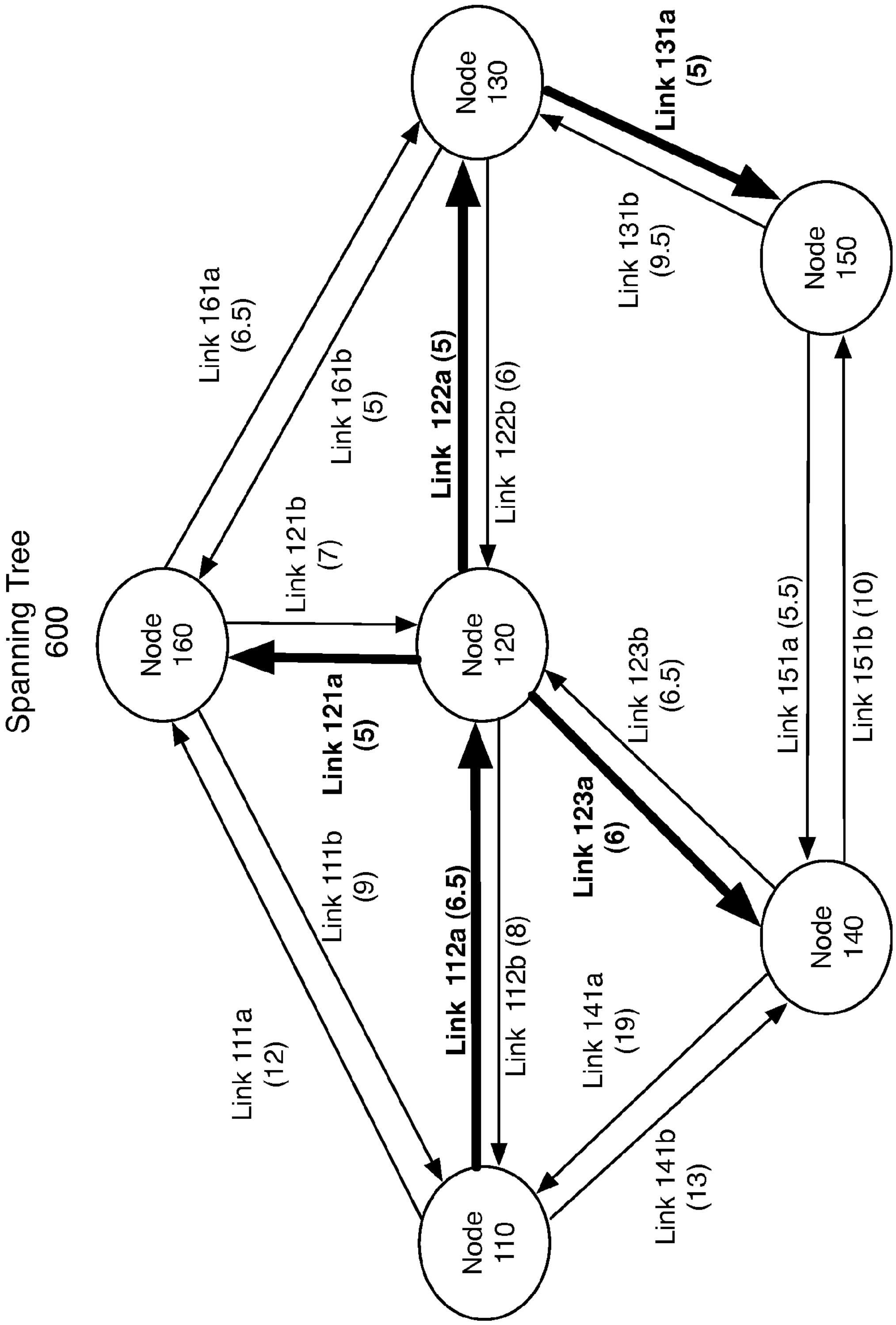
FIG. 6 illustrates an example spanning tree for a network of nodes.

FIG. 6 illustrates an example spanning tree 600 for a network of nodes (e.g., network 100) in accordance with the present disclosure. In some examples, a link state matrix may have been built as described above for table 500 and a spanning tree 600 may be generated based on the link state matrix. The spanning tree 600 may have node 110 as the root node of the spanning tree and the bold, heavy lines shown in FIG. 6 depict the outgoing links of the communication channels included in spanning tree 600 and via which updated link state information (e.g., via LSA packets) may be forwarded from the nodes of network 100. Total QoS state scores from table 500 for the outgoing links of the communication channels interconnecting the nodes of network 100 are also shown in FIG. 6 as values in parenthesis. For example, a total QoS state score of 6.5 is depicted in FIG. 6 for outgoing link 112*a* of communication channel 112 as (6.5).

In some examples, a dissemination manager 105 at a node may be configured to implement a spanning tree generating algorithm that bases selection of the nodes and outgoing links of communication channels based on the lowest total QoS state score for forwarding data between nodes of network 100. The total QoS state score may be based on a single outgoing link's total QoS state score or may be based on a cumulative total QoS state score for more than one outgoing link of more than one communication channel. For example, the outgoing link 112*a* for communication channel 112 and outgoing link 121*a* for communication channel 121 may be selected to forward data from node 110 to node 160. For this example, the outgoing links 112*a* and 121*a* for communication channels 112 and 121 have a lower cumulative total QoS state score of 11.5 compared to the total QoS state score of 12 for the outgoing link 111*a* of communication channel 111.

FIG. 7 illustrates an example table 700 for link state information for a node (e.g., node 110) following initiation of a spanning tree (e.g., spanning tree 600), in accordance with the present disclosure. In some examples, after the establishment or initiation of spanning tree 600, dissemination manager 105 at node 110 may be configured to monitor the current QoS state of outgoing links 111*a*, 112*a* and 141*b* for communication channels 111, 112 and 141, respectively. Table 700, as shown in FIG. 7, may include the results of that monitoring shown in the column entitled "current QoS states" and the results of previous monitoring shown in the column entitled "previous QoS states". Dissemination manager 105 for node 110 may at least temporarily store table 700 in a memory (e.g., memory 230 and/or memory 101).

In some examples, dissemination manager 105 at node 110 may be configured to determine whether a threshold for a QoS state of the outgoing links 111*a*, 112*a* and 141*b* has been reached. The threshold may be based on whether the current QoS state indicates a change in a service class supported. For example, table 700 indicates that for outgoing link 111*a* the delay has changed from 21 ms to 1 ms, packet loss has changed from 0.04 packets per thousand to 0.009 packets per thousand and security requirement has changed from 64-bit to no security. Table 700 also indicates that for outgoing link 112*a*, delay has changed from 1.5 ms to 21 ms. According to Table 1, these four changes may separately result in a change in the service class supported by the outgoing links 111*a* and 112*a*.

In some examples, a change in the service class supported by the outgoing links 111*a* and 112*a* may lead to a determination by dissemination manager 105 at node 110 that the threshold for the QoS state has been reached for these outgoing links. Dissemination manager 105 of node 110 may update the link state matrix for network 100 based on this determination of the threshold being reached. Thus, for example, the information maintained in table 500 as shown in FIG. 5 may be modified or updated to indicate the class now supported by outgoing links 111*a* and 112*a*.

FIG. 8 illustrates an example table 800 for an updated link state matrix for a network of nodes (e.g., network 100), in accordance with the present disclosure. In some examples, table 800 may be the result of the updated link state matrix for network 100 performed by dissemination manager 105 of node 110 as mentioned above for FIG. 7. So as shown in FIG. 8, table 800 indicates that the total QoS state score for outgoing link 111*a* is 5 and the total QoS state score for the outgoing link 112*a* is 10.5.

Figure 9:
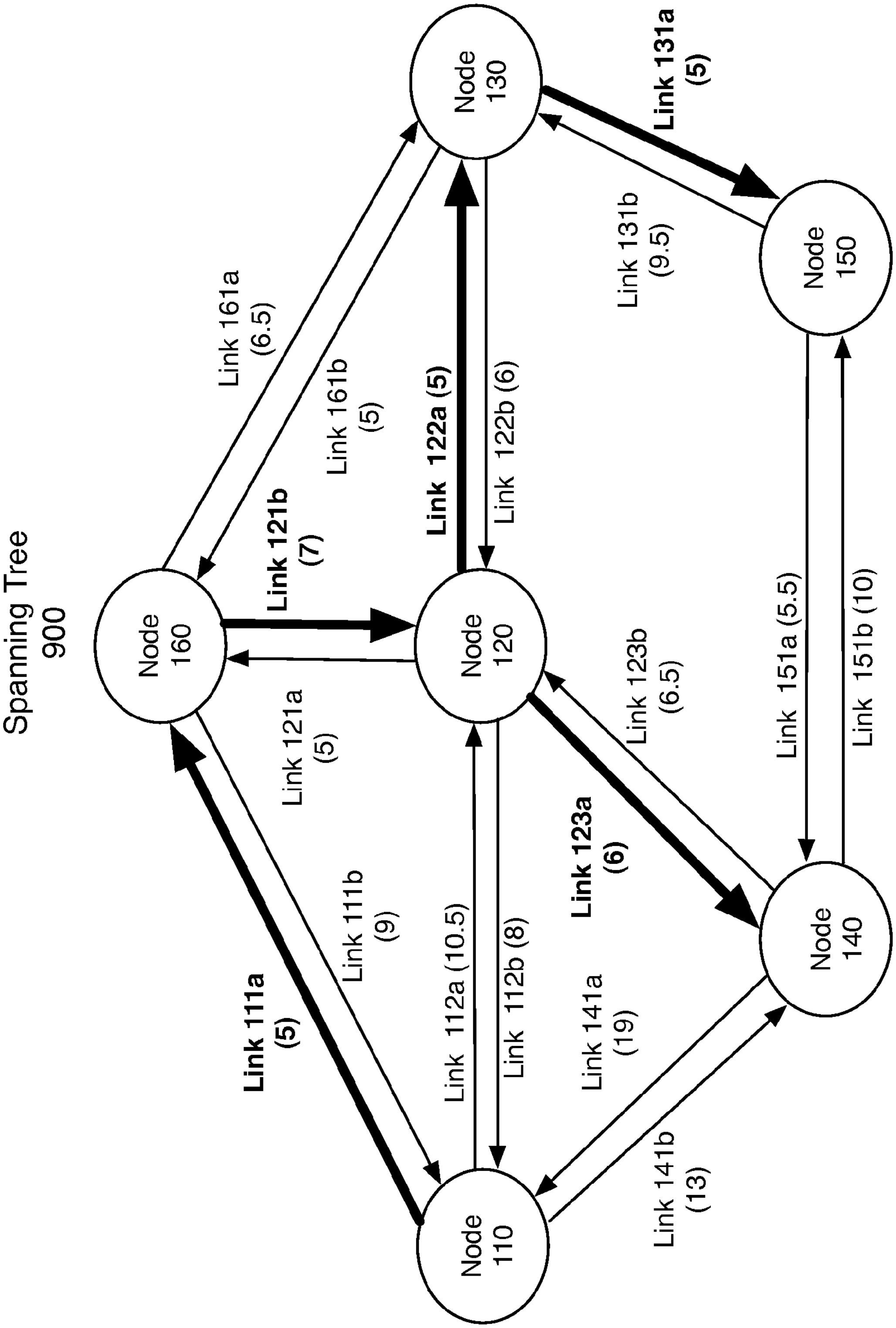
FIG. 9 illustrates an example updated spanning tree for a network of nodes.

FIG. 9 illustrates an example updated spanning tree 900 for a network of nodes (e.g., network 100), in accordance with the present disclosure. In some examples, dissemination manager 105 at node 110 may update the spanning tree 600 depicted in FIG. 6 by generating spanning tree 900 based on the updated link state matrix for network 100 depicted in table 800 of FIG. 8. Similar to spanning tree 600, the spanning tree 900 may also have node 110 as the root node of the spanning tree. The bold, heavy lines shown in FIG. 9 depict outgoing links of communication channels included in spanning tree 900 and also indicate a route via which link state information may be disseminated between nodes included in spanning tree 900. Total QoS state scores from table 800 for the outgoing links of the communication channels interconnecting the nodes of network 100 are also shown in FIG. 9.

As illustrated in FIG. 9, spanning tree 900 does not include the outgoing link 112*a* as was included in spanning tree 600. Rather, because outgoing link 112*a* has a lower total QoS state score than outgoing link 111*a*, outgoing link 112*a* is included in spanning tree 900. Thus, spanning tree 900 is actually a different or new spanning tree. In alternative examples (not shown), spanning tree 600 may be updated in such a way as to not change the outgoing links. For example, the total QoS state scores change for one or more outgoing links for communication channels but the change does not result in a better QoS route. So for these alternative examples, spanning tree 600 may be merely updated and a new or different spanning tree is not generated.

In some examples, dissemination manager 105 at node 110 may be configured to generate a QoS state update LSA packet in the format of packet format 400. Spanning tree 900 may be used to disseminate the updated link state information included in the QoS state update LSA packet. For example, a dissemination manager 105 at node 110 may be configured to forward the QoS state update LSA packet to its spanning tree child node. Spanning tree 900 in FIG. 9 depicts that child node as node 160. Thus, for example, the QoS state update LSA packet may be forwarded to child node 160 via outgoing link 111*a*.

According to some examples, dissemination manager 105 at node 160 may be configured to receive the QoS state update LSA packet and update its version of the link state matrix (e.g., maintained in memory 101) to reflect the QoS state changes for outgoing links 111a and 112a. Dissemination manager 105 at node 160 may also be arranged to determine whether a QoS state associated with at least one of node 160's outgoing links 111b, 121b and 161a has changed. In some examples, dissemination manager 105 at node 160 may also be arranged to determine whether possible changes in the QoS state are above a threshold (e.g., resulted in a supported service class change).

In some examples, if there were no changes in the QoS state or if the changes are not above the threshold, dissemination manager 105 at node 160 may be configured to generate an acknowledgement LSA packet to be forwarded to its spanning tree parent node of node 110. The acknowledgement LSA packet may be in the format of packet format 400. Since there were no changes above the threshold, the acknowledgement LSA packet may be adapted to indicate no changes in QoS states and also indicate that Node 160 has received the updated link state information from node 110. Dissemination manager 105 at node 160 may also be configured to forward the QoS state update LSA packet received from node 110 to node 160's spanning tree children. As shown in FIG. 9, node 160 has node 120 as a spanning tree child for spanning tree 900. So the QoS state update LSA packet may be forwarded to node 120 via outgoing link 121b.

In some examples, dissemination manager 105 at node 120 may be configured to receive the QoS state update LSA packet forwarded from node 160 as mentioned above. Dissemination manager 105 at node 120 may also be configured to update its version of the link state matrix (e.g., maintained in memory 101) to reflect the QoS state changes for outgoing links 111a and 112a. Dissemination manager 105 at node 160 may also be arranged to determine whether a QoS state associated with at least one of its outgoing links 112b, 121a, 122a and 123a has changed. In some examples, dissemination manager 105 at node 120 may also be arranged to determine whether possible changes in the QoS state are above a threshold (e.g., resulted in a supported service class change). Similar to as described above for node 160, if no changes, dissemination manager 105 at node 120 may be configured to acknowledge receipt of the QoS state update LSA packet to node 160. Dissemination manager 105 at node 120 may also be configured to forward the received QoS state update LSA packet to node 120's spanning tree children. As shown in FIG. 9, spanning tree 900 indicates that node 120 has node 130 and node 140 as spanning tree children.

FIG. 10 illustrates an example table 1000 for link state information for a child node (e.g., node 120) following receipt of updated link state information from a parent node (e.g., node 160) of a spanning tree (e.g., spanning tree 900), in accordance with the present disclosure. In some examples, dissemination manager 105 at node 120 may have determined that a QoS state associated with at least one of node 120's outgoing links 112b, 121a, 122a or 123a has changed. For example, table 1000, as shown in FIG. 10, indicates that several of the current QoS states have changed from the previous QoS states. Similar to as described above, dissemination manager 105 at node 120 may be configured to determine whether a threshold associated with change in a service class supported has been reached. For example, table 1000 indicates that for outgoing link 123a, delay has changed from 1.5 ms to 25 ms, packet loss has changed from a packet loss per thousand packets of 0.009 to 1.1 and security requirement has changed from a no security requirement to a security requirement of 128-bit. According to Table 1, these three changes may separately result in a change in the service class supported by outgoing link 123a.

In some examples, the change in the service class supported by the outgoing link 123a may lead to a determination by dissemination manager 105 at node 120 that the threshold for the QoS state has been reached for this outgoing link. Dissemination manager 105 at node 120 may be configured to update the link state matrix for network 100 based on this determination of the threshold being reached. Thus, for example, the information maintained in table 500 as shown in FIG. 5 may be modified or updated to indicate the service classes now supported by outgoing link 123a. Also, the link state update information received in the QoS state update LSA packets (forwarded from node 110) that indicated the changed QoS states for the outgoing links 111a and 112a may also be used to update the link state matrix to indicate the class now supported by outgoing links 111a and 112a.

FIG. 11 illustrates an example table 1100 for an updated link state matrix for a network of nodes (e.g., network 100), in accordance with the present disclosure. In some examples, table 1100 may be the result of the updated link state matrix for network 100 performed by dissemination manager 105 at node 120 as mentioned above for FIG. 10. So as shown in FIG. 11, table 1100 indicates that updates to the total QoS state scores for outgoing links 111a, 112a and 123a. Table 1100 shows the total QoS score for outgoing link 123a has increased to a substantially higher score of 20 from a previous score of 6.

Figure 12:
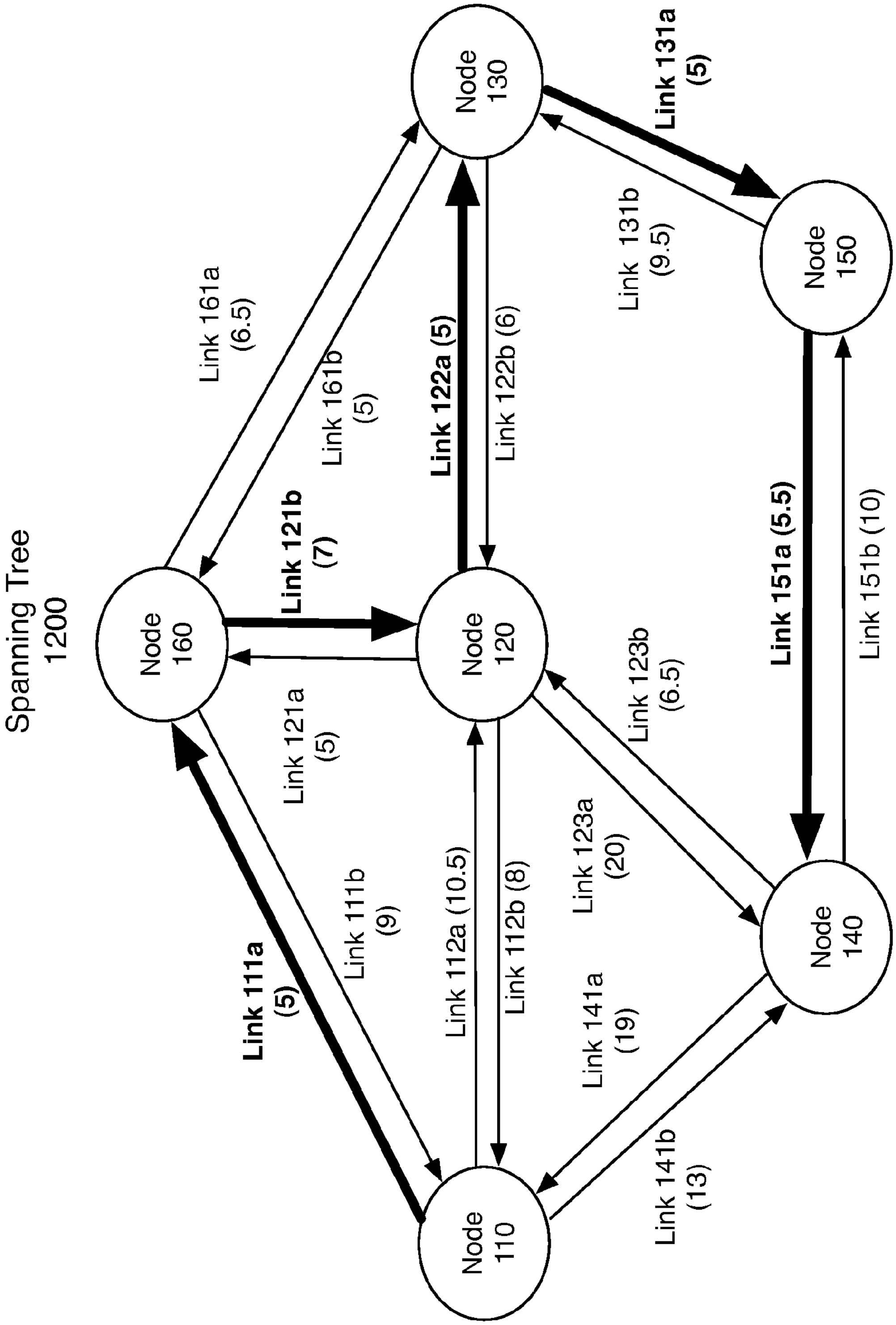
FIG. 12 illustrates an example adjusted spanning tree for a network of nodes.

FIG. 12 illustrates an example adjusted spanning tree 1200 for a network of nodes (e.g., network 100), in accordance with the present disclosure. In some examples, dissemination manager 105 at node 120 may be configured to adjust a spanning tree (e.g., spanning tree 900) based on an updated link state matrix. For example, based on the updated link state matrix depicted in FIG. 11. An example of an adjusted spanning tree is depicted as spanning tree 1200 in FIG. 12. Spanning tree 1200 still has node 110 as the root node and node 160 remains as a spanning tree parent node for node 120. However, the children nodes for node 120 have been adjusted such that node 140 is no longer a direct child for node 120. The bold, heavy lines shown in FIG. 12 depict outgoing links of communication channels included in spanning tree 1200 and also indicate a route via which updated link state information may be disseminated between nodes included in spanning tree 1200. Total QoS state scores from table 1100 for the outgoing links of the communication channels interconnecting the nodes of network 100 are also shown in FIG. 12.

According to the example spanning tree 1200 shown in FIG. 12, outgoing link 123a is not included in the adjusted spanning tree 1200. Outgoing link 123's exclusion, for example, is because outgoing links 122a, 131a and 151a have a lower cumulative total QoS state score of 15.5 compared to the total QoS state score of 20 for outgoing link 123a. Thus, in some examples, spanning tree 1200 may actually be a different or new spanning tree for purposes of disseminating updated link state information to spanning tree 1200's children and grand children (children of children).

In some examples, dissemination manager 105 at node 120 may be configured to generate a QoS state update LSA packet in the format of packet format 400. This QoS state update LSA packet may include the updated link state information associated with outgoing links 111a and 112a received from node 110 and may also include the current link state information associated with outgoing link 123a at node 120. The adjusted spanning tree 1200 may be used to forward the QoS state update LSA packet to a spanning tree child of node 120. The spanning tree child is depicted in FIG. 12 as node 130 that couples to node 120 via communication channel 122.

In some examples, a dissemination manager 105 at node 130 may be configured to receive the QoS state update LSA packet from its spanning tree parent of node 120. The dissemination manager 105 at node 130 may update its link state matrix, determine if changes to QoS states for its outgoing links have reached a threshold and adjust spanning tree 1200 if the threshold is reached. The dissemination manager 105 at node 130 may also be arranged to generate an acknowledgement LSA packet to be forwarded to spanning tree 1200 parent node 120 and generate a QoS state update LSA packet to be forwarded to a spanning tree child of node 130. In some examples, as shown in FIG. 12, if spanning tree 1200 is not adjusted by dissemination manager 105 at node 130, the spanning tree child of node 130 may be node 150.

According to some examples, dissemination manager 105 at node 120 may be configured to generate an acknowledgment LSA packet in the format of packet format 400. The acknowledgement LSA packet may include an indication that node 120 has received the updated link state information from node 110 and also includes updated link state information for outgoing link 123*a*. The acknowledgment LSA packet may be forwarded to node 120's spanning tree parent node 160 according to unadjusted spanning tree 900.

In some examples, using an unadjusted spanning tree to send the acknowledgment LSA packet to a node's (e.g., node 120) unadjusted spanning tree parent (e.g., node 160) maintains the root node for the unadjusted spanning tree and may ensure that other nodes of the network that are not spanning tree parents or grandparents of node 120 do not receive redundant updated link state information for the outgoing links of the root node (e.g., outgoing links 111*a* and 112*a*). Eliminating the forwarding of possibly redundant link state information may reduce the amount of network overhead associated with disseminating link state update information between the nodes of the network.

According to some examples, outgoing link 122*b* of communication channel 122 may become broken or severely impaired. The broken or severely impaired state of outgoing link 122*b* may be due to a complete failure of outgoing link 122*b* or at least an impairment (e.g., heavy congestion) that excessively impairs a dissemination manager 105 at node 130 from sending an acknowledgement of receipt of a state update LSA packet from node 120.

In some examples, following the forwarding of the state update LSA packet to child node 130, dissemination manager 105 at node 120 may be configured to determine whether node 130 has failed to send an acknowledgement LSA packet. The determination may be based on whether an acknowledgement LSA packet in the format of packet format 400 has been received from node 130 within a time interval (e.g., several seconds). If a determination is made that an acknowledgement LSA packet is not received within the time interval, dissemination manager 105 at node 120 may be configured to generate a fail LSA packet in the format of packet format 400 and forward the fail LSA packet to node 120's spanning tree parent of node 160. The fail LSA packet may include the link state update information as described above for FIG. 12 as well as an indication of a node that may be unreachable. As mentioned above, that link state update information included link state updates for outgoing links 111*a*, 112*a* and 123*a*.

According to some examples, a dissemination manager 105 at node 160 may be configured to receive the fail LSA packet and then search for an alternative route or path to node 130 via which link state information included in the fail LSA packet may be forwarded. For example, as shown in FIG. 12, outgoing link 161*a* of communication channel 161 may be an alternative path to node 130 via which the link state information included in the fail LSA packet (e.g., updates for links 111*a*, 112*a* and 123*a*) may be forwarded. Dissemination manager 105 at node 160 may also be configured to receive an acknowledgement LSA packet (e.g., in the packet format of packet format 400) and then forward the received acknowledgement LSA packet to node 120 to indicate that the update information was successfully received by node 130.

In some examples, the dissemination manager 105 at node 160 may not receive an acknowledgment LSA packet from node 130. For these examples, dissemination manager 105 at node 160 may be further configured to forward the fail LSA packet received from node 120 to node 160's parent node 110. The dissemination manager 105 at node 110 may be configured to receive the fail LSA packet from node 160 and search for an alternative route or path to node 130 via which link state information included in the fail LSA packet may be forwarded. For example, as shown in FIG. 12, another alternative path to node 130 may include outgoing links 141*b*, 151*b* and 131*b* of communication channels 141, 151 and 131, respectively. Dissemination manager 105 at nodes 140 and 150 may be configured to separately forward the link state information included in the fail LSA packet via the other alternative path to node 130. If an acknowledgement LSA packet is forwarded by node 130 to indicate receipt of the link state information included in the fail LSA packet, the acknowledgment LSA may be forwarded back to node 120.

In some examples, node 130 may have not acknowledged receipt of the link state information included in the fail LSA packet from either the path through outgoing link 161*a* of communication channel 160 or the path through outgoing links 141*b*, 151*b* and 131*b* of communication channels 141, 151 and 131, respectively. As shown in FIG. 12, no other alternative paths are possible in network 100 to reach node 130. Node 130 may now be considered an isolated node and dissemination manager 105 at node 120 may initiate the rebuilding of a spanning tree for network 100 that accounts for the isolated or unreachable status of node 130.

In some examples, the rebuilding of the spanning tree may include the dissemination manager 105 at node 120 being configured to generate a flood LSA packet in the format of packet format 400 and forwarding the flood LSA packet to the other nodes of network 100. Dissemination manager 105*s* at other nodes of network 100 may be configured such that they will separately generate their own flood LSA packet upon receipt of the flood LSA packet and also forward their separately generated flood LSA packet to the nodes of network 100. Each dissemination manager 105 at a node of network 100 that has received flood LSA packets from the nodes of network 100 may also be configured to then build a new or update their existing link state matrix. As mentioned above, node 120 may be the root node for the rebuilt spanning tree. Using node 120 as the root node, dissemination manager 105*s* at the nodes of network 100 may then rebuild the spanning tree based on the new or updated link state matrix.

Figure 13:
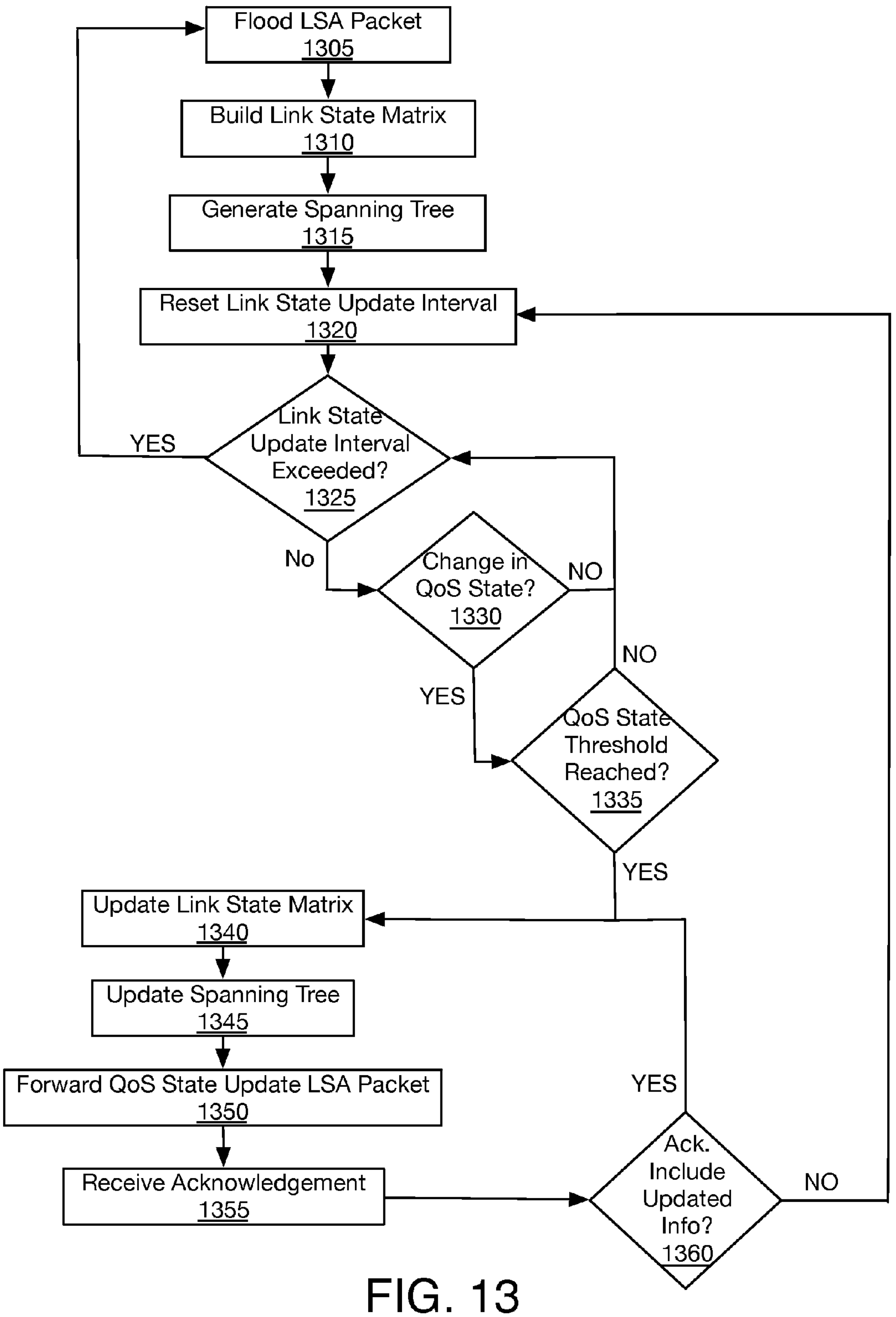
FIG. 13 illustrates a flow chart of an example method for a root node to disseminate updated link state information.

FIG. 13 illustrates a flow chart of an example method for a root node (e.g. node 110) to disseminate updated link state information, in accordance with the present disclosure. Network 100 as shown in FIG. 1 and dissemination manager 105 as described for FIG. 2 may be used to illustrate the example methods. But the described methods are not limited to only implementations on network 100 with nodes having a dissemination manager 105 as described in the above mentioned FIGS.

Processing may begin at block 1305 (Flood LSA Packet), where dissemination manager 105 at node 110 (e.g., via LSA feature 211) may be configured to obtain link state information (e.g., from memory 230 and/or memory 101) for outgoing links 111*a*, 112*a* and 114*b*. The dissemination manager 105 may then be arranged to generate a flood LSA packet and forward the flood LSA packet to the nodes of network 100. In some examples the link state information may include the QoS state information shown in table 300 of FIG. 3 and the flood LSA packet may be in the format of packet format 400 shown in FIG. 4.

Processing may continue from block 1305 to block 1310 (Build Link State Matrix), where the dissemination manager 105 at node 110 (e.g., via LSA feature 211) may be arranged to receive separate flood LSA packets from the other nodes of network 100. The dissemination manager 105 at node 110 may also (e.g., via matrix feature 213) be configured to build or generate a link state matrix and at least temporarily store the link state matrix in memory 101 at node 110. In some examples, the link state matrix may be built based on the link state information for node 110's outgoing links and based on the link state information included in the separately received flood LSA packets. Table 500 as shown in FIG. 5 may be an example of a link state matrix for network 100.

Processing may continue from block 1310 to block 1315 (Generate Spanning Tree), where the dissemination manager 105 at node 110 (e.g., via spanning tree feature 213) may be adapted to build or generate a spanning tree based on the link state matrix for network 100. In some examples, as described above for FIG. 6, node 110 may be the root node and the generated spanning tree may be spanning tree 600 as shown in FIG. 6. The built or generated spanning tree may be at least temporarily stored in memory 101 at node 110.

Processing may continue from block 1315 to block 1320 (Reset Link State Update Interval), where the dissemination manager 105 at node 110 (e.g., via timer feature 214) may be arranged to reset a timer associated with a link state update interval. In some examples, a link state update interval may be associated with a maximum time interval for which a node can wait without receiving or forwarding updated link state information. The link state update interval may be based on keeping link state information for network 100 from becoming stale (e.g., several minutes or more). Yet the link state update interval may not be so short as to place an excessive burden on network 100 as to outweigh the freshness of the updated link state information.

Processing may continue from block 1320 to decision block 1325 (Link State Update Interval Exceeded?), where the dissemination manager 105 at node 110 (e.g., via timer feature 214) may be arranged to determine whether a link state update interval has been exceeded. Processing may continue from decision block 1325 to block 1305 when the method determines that the timer associated with the link state update interval has expired. Otherwise, processing may continue from decision block 1325 to decision block 1330 when the method determines that the timer associated with the link state update interval has not expired.

At decision block 1330 (Change in QoS State?), the dissemination manager 105 at node 110 (e.g., via monitor feature 215) may be adapted to monitor the current QoS state of outgoing links 111*a*, 112*a* and 141*b*. In some examples, as mentioned above for FIG. 7, example current QoS states of outgoing links 111*a*, 112*a* and 141*b* may be maintained in table 700. Table 700 may be at least temporarily stored in a memory maintained at node 110 (e.g., memory 230 and/or memory 101). In some examples, a minimum time threshold may need to be met before a determination can be made that a QoS state of any of the outgoing links 111*a*, 112*a* and 141*b* has changed. Since the QoS state of an outgoing link may fluctuate continuously, the minimum time threshold may lessen the workload on dissemination manager 105 at node 110 and/or reduce dissemination overhead due to possible state updates caused by continuous QoS state fluctuations. Processing may continue from decision block 1330 to decision block 1335 when, following the minimum time threshold, the method determines that the QoS state of any of the outgoing links 111*a*, 112*a* or 141*b* has changed. Otherwise, processing moves from decision block 1330 back to decision block 1325 when the method determines that the QoS state has not changed.

At decision block 1335 (QoS State Threshold Reached?), the dissemination manager 105 at node 110 is arranged to determine (e.g., via threshold feature 216) whether a threshold for a QoS state of the outgoing links 111*a*, 112*a* and 141*b* has been reached. The threshold may be based on whether the current QoS state indicates a change in a service class supported as compared to the previous QoS state. Processing may continue from decision block 1335 to block 1340 when the method determines that a threshold for a QoS state of the outgoing links 111*a*, 112*a* or 141*b* has been reached. Otherwise, processing may continue from decision block 1335 to 1325 when the method determines that the QoS threshold has not been reached.

At block 1340 (Update Link State Matrix), the dissemination manager 105 at node 110 updates the link state matrix (e.g., via matrix feature 212). In some examples, the information included in table 700 is used to update the link state matrix information included in table 500.

Processing may continue from block 1340 to block 1345 (Update Spanning Tree), where the dissemination manager 105 at node 110 may be configured to update spanning tree 600 (e.g., via spanning tree feature 213) based on the updated link state matrix. In some examples, spanning tree 900 as shown in FIG. 9 may be generated based on the updated link state matrix. The updated spanning tree may then be at least temporarily stored in memory 101 at node 110.

Processing may continue from block 1345 to block 1350 (Forward QoS State Update LSA Packet), where the dissemination manager 105 at node 110 (e.g., via LSA feature 211) may be configured to generate and forward a QoS state update LSA packet. In some examples, the QoS state update LSA packet may be in the format of packet format 400 and may include updated link state information for one or more of the outgoing links coupled to node 110. The dissemination manager 105 at node 110 may be configured to use spanning tree 900 to forward the QoS state update LSA packet to child node 160.

Processing may continue from block 1350 to block 1355 (Receive Acknowledgement), where the dissemination manager 105 at node 110 (e.g., via LSA feature 211) may be arranged to receive an acknowledgement from child node 160 to indicate that the updated link state information was received.

Processing may continue from block 1355 to decision block 1360 (Acknowledgement Include Updated Info?), where the dissemination manager 105 at node 110 (e.g., via LSA feature 211) may be configured to determine whether the received acknowledgement LSA packet from node 160 included updated link state information. In some examples, as mentioned above, an acknowledgement LSA packet in the format of packet format 400 may include updated or current link state information for an outgoing link of the receiving node. Processing may proceed from decision block 1360 to block 1340 when the method determines that the acknowledgement included updated link state information. Otherwise, the process may proceed from decision block 1360 to block 1320 when the method determines that the acknowledgement does not include updated link state information.

Figure 14:
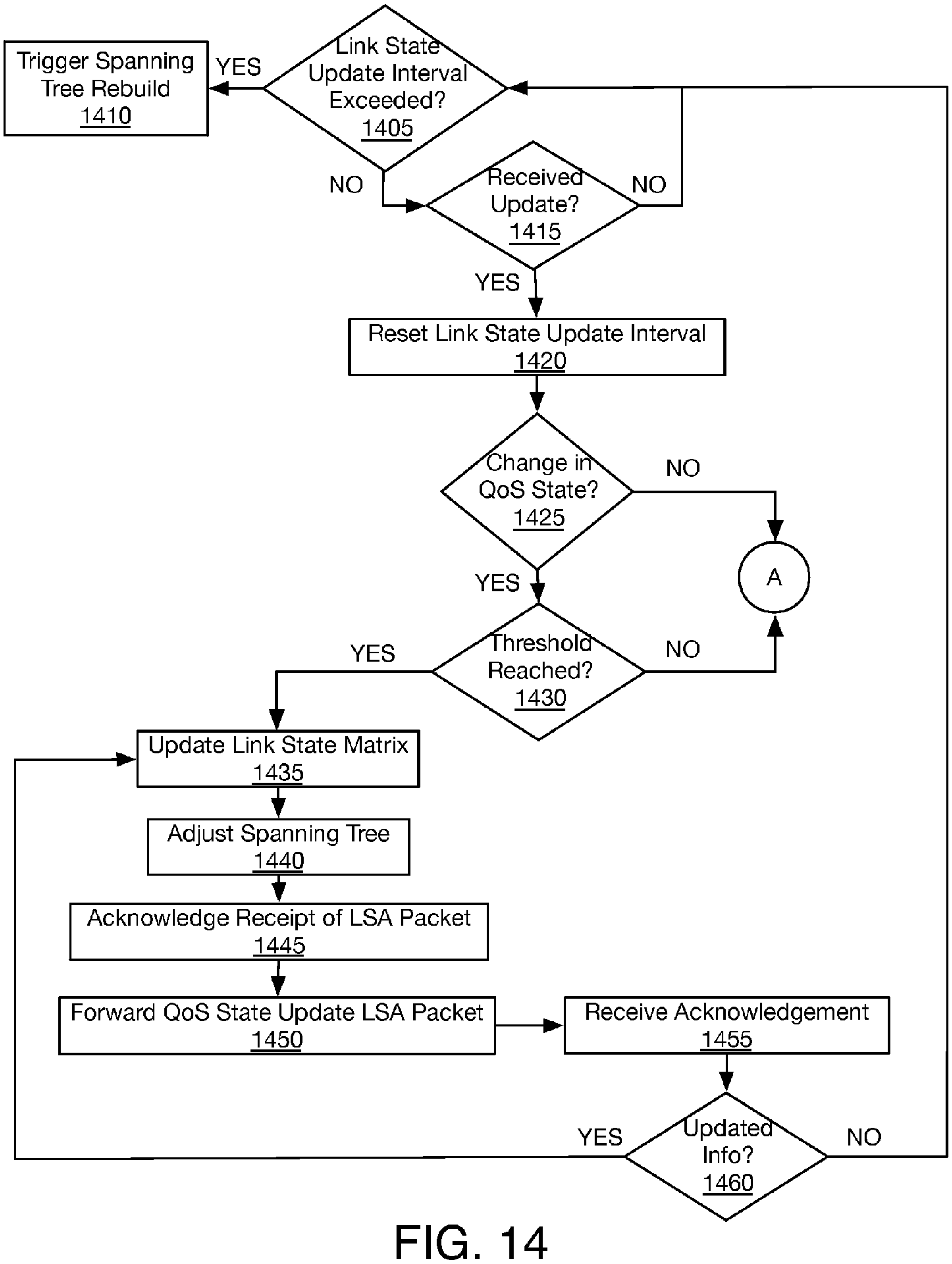
FIG. 14 illustrates a flow chart of an example method for a child node to disseminate updated link state information following receipt of updated link state information from a parent node.

FIG. 14 illustrates a flow chart of an example method for a child node (e.g., node 120) to disseminate updated link state information following receipt of updated link state information from a parent node (e.g., node 110), in accordance with the present disclosure. Network 100 as shown in FIG. 1 and dissemination manager 105 as described for FIG. 2 are used to illustrate the example methods. But the described methods are not limited to only implementations on network 100 with nodes having a dissemination manager 105 as described in the above mentioned FIGS.

Processing may begin at decision block 1405 (Link State Update Interval Exceeded?), where the dissemination manager 105 at node 120 (e.g., via timer feature 214) may be adapted to determine whether a link state update interval has been exceeded. As mentioned above for the example methods illustrated in FIG. 13, a timer may be set (e.g., via timer feature 214) for a link state update interval associated with a maximum time interval for which a node can wait without receiving or forwarding link state information to other nodes of network 100. In some examples, when the timer has expired, the process may proceed from decision block 1405 to block 1410. Otherwise, processing may continue from decision block 1405 to decision block 1415 when the timer has not expired.

At block 1410 (Trigger Spanning Tree Rebuild), the dissemination manager 105 at node 120 may be adapted to initiate (e.g., via LSA feature 211) building of a new spanning tree for network 100. That initiation may follow the example methods described for FIG. 13.

At decision block 1415 (Received Update?), the dissemination manager 105 at node 120 (e.g., via LSA feature 211) may be arranged to determine whether a QoS state update LSA packet has been received. As mentioned above, node 120 may be a spanning tree 900 child node. As a result of being a child node, node 120 may receive QoS State Update LSA packets forwarded from node 120's spanning tree parent node. As shown in FIG. 9, node's 120's spanning tree parent node may be node 160. Processing may continue from decision block 1415 to block 1420 when the method determines that a QoS state update LSA packet has been received. Otherwise, processing may continue from decision block 1415 to decision block 1405 when the method determines that a QoS state update LSA packet has not been received.

At block 1420 (Reset Link State Update Interval), the dissemination manager 105 at node 120 (e.g., via timer feature 214) may be configured to reset the timer associated with the link state update interval. In some examples, the timer may be reset due to the receipt of a QoS state update LSA packet.

Processing may continue from block 1420 to decision block 1425 (Change in QoS State?), where the dissemination manager 105 at node 120 (e.g., via monitor feature 215) may be adapted to monitor the current QoS state of outgoing links 112*b*, 121*a*, 122*a* and 123*a*. In some examples, as mentioned above for FIG. 10, example current QoS states of outgoing links 112*b*, 121*a*, 122*a* and/or 123*a* may be maintained in table 1000. Table 1000 may be at least temporarily stored in a memory maintained at node 120 (e.g., memory 230 and/or memory 101). As mentioned above for FIG. 13, a minimum time threshold may need to be met before a determination can be made that a QoS state associated with outgoing links 112*b*, 121*a*, 122*a* and 123*a* has changed. Processing may continue from decision block 1425 to decision block 1430 when the method determines, following the minimum time threshold, that the QoS state of any of the outgoing links 112*b*, 121*a*, 122*a* and 123*a* has changed. Otherwise, processing may continue from decision block 1430 to process point A when the method determines that the QoS state has not changed. Process point A is described in more detail below for FIG. 15.

At decision block 1430 (Threshold Reached?), the dissemination manager 105 at node 120 may be arranged to determine (e.g., via threshold feature 216) whether a threshold for a QoS state of the outgoing links 112*b*, 121*a*, 122*a* and/or 123*a* has been reached. The threshold may be based on whether the current QoS state indicates a change in a service class supported as compared to the previous QoS state. Processing may continue from decision block 1430 to block 1435 when the method determines that a threshold for a QoS state for any of the outgoing links 112*b*, 121*a*, 122*a* and/or 123*a* has been reached. Otherwise, the process may continue from decision block 1430 to process point A when the method determines that the threshold has not been reached.

At block 1435 (Update Link State Matrix), the dissemination manager 105 at node 120 may be arranged to update the link state matrix (e.g., via matrix feature 212). In some examples, the updates may be to a link state matrix that includes the information in table 500 depicted in FIG. 5. The link state matrix may be maintained in memory 101 at node 120 and the link state matrix may be obtained (e.g., by matrix feature 213) and updated using link state information included in the received QoS state update LSA packet. The link state matrix may also be updated to indicate the determined changes in the QoS state for outgoing links 112*b*, 121*a*, 122*a* and 123*a*. For example, the determined changes may include the information in table 1000 depicted in FIG. 10. The update state matrix for this example may include the information in table 1100 depicted in FIG. 11. The updated link state matrix may then be at least temporarily stored in memory 101 at node 120.

Processing may continue from block 1435 to block 1440 (Adjust Spanning Tree), where the dissemination manager 105 at node 120 may be arranged to adjust spanning tree 900 (e.g., via spanning tree feature 213) based on the updated link state matrix. In some examples, spanning tree 1200, as shown in FIG. 12, may be generated based on the updated link state matrix. The adjusted spanning tree may then be at least temporarily stored in memory 101 at node 120.

Processing may continue from block 1440 to block 1445 (Acknowledge Receipt of LSA packet), where the dissemination manager 105 at node 120 (e.g., via LSA feature 211) may be configured to acknowledge receipt of the QoS state update LSA packet. In some examples, an acknowledgement LSA packet in the packet format of format 400 may be generated. Since a determination was made that a change had occurred in the QoS state of outgoing links 112*b*, 121*a*, 122*a* and 123*a*, the acknowledgement LSA packet would contain new or updated information associated with the current QoS state of outgoing links 112*b*, 121*a*, 122*a* and 123*a*. In some examples, to prevent redundant update information from being sent to other nodes (e.g., non-parents or non-grandparents), the generated acknowledgement LSA packet may then be forwarded to node 120's spanning tree 900 parent node 160. Thus an unadjusted spanning tree 900 is used to forward the acknowledgement LSA packet.

Processing may continue from block 1445 to block 1450, (Forward QoS State Update LSA Packet), where the dissemination manager 105 at node 120 (e.g., via LSA feature 211) may be configured to forward a newly generated QoS state update LSA packet. In some examples, the newly generated QoS state update LSA packet may include the information received in the QoS state update LSA packet from node 120's parent node. The newly generated QoS state update LSA packet may also include information associated with the current QoS state of outgoing links 112*b*, 121*a*, 122*a* and 123*a*.

The newly generated QoS state update LSA packet may be forwarded to node 120's spanning tree 1200 children. As shown in FIG. 12, node 120's spanning tree children include node 130.

Processing may continue from block 1450 to block 1455 (Receive Acknowledgement), where the dissemination manager 105 at node 120 (e.g., via LSA feature 211) may be adapted to receive an acknowledgement from its child node (e.g., node 130) to indicate that the updated link state information was received. In some examples, the acknowledgement may be received from the child node using an acknowledgement LSA packet in the format of packet format 400.

Processing may continue from block 1455 to decision block 1460 (Updated Info?), where the dissemination manager 105 at node 120 (e.g., via LSA feature 211) may be configured to determine whether the received acknowledgement LSA packet from its child node (e.g., node 130) included updated state information. In some examples, as mentioned above, an acknowledgement LSA packet in the format of packet format 400 may include updated or current link state information for an outgoing link of the receiving node. Processing may continue from decision block 1460 to block 1435 when the method determines that the acknowledgement included updated state information. Otherwise, the process may continue from decision block 1460 to block 1405 when the method determines that the acknowledgement does not include updated state information.

Figure 15:
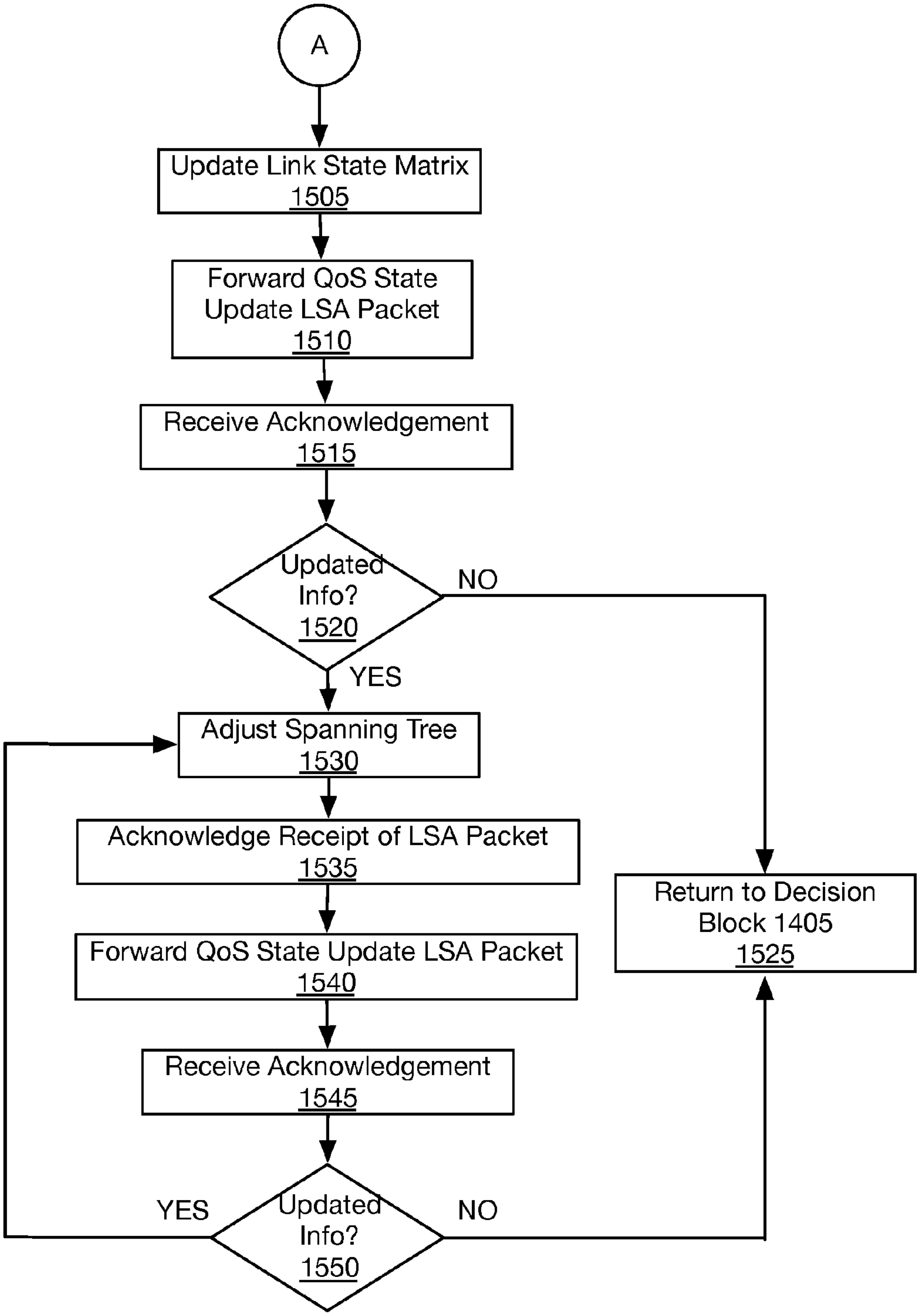
FIG. 15 illustrates a flow chart of an example method for a child node to disseminate updated link state information following receipt of updated link state information from a parent node.

FIG. 15 illustrates a flow chart of an example method for a child node (e.g., node 120) to disseminate updated link state information following receipt of updated link state information from a parent node (e.g., node 110), in accordance with the present disclosure. Network 100 as shown in FIG. 1 and dissemination manager 105 as described for FIG. 2 are used to illustrate the example methods. But the described methods are not limited to only implementations on network 100 with nodes having a dissemination manager 105 as described in the above mentioned FIGS. As mentioned above for FIG. 14, process point A, may be the point at which a node has received updated link state information but either has determined that there was no change in a QoS state (see decision block 1425) or a QoS threshold was not reached (see decision block 1430).

Continuing from process point A to block 1505 (Update Link State Matrix), the dissemination manager 105 at node 120 updates the link state matrix (e.g., via matrix feature 212). In some examples, the updates may be to a link state matrix that includes the information in table 500 depicted in FIG. 5. The link state matrix may be maintained at memory 101 at node 120 and the link state matrix may be obtained (e.g., by matrix feature 213) and updated using link state information included in the received QoS state update LSA packet. The updated link state matrix may then be at least temporarily stored in memory 101 at node 120.

Processing may continue from block 1505 to block 1510 (Forward QoS State Update LSA Packet), where the dissemination manager 105 at node 120 (e.g., via LSA feature 211) may be adapted to forward the received QoS state update LSA packet. In some examples, the QoS state update LSA packet may be forwarded to node 120's spanning tree 900 children. As shown in FIG. 9, node 120's spanning tree children are nodes 130 and 140.

Processing may continue from block 1510 to block 1515 (Receive Acknowledgement), where the dissemination manager 105 at node 120 (e.g., via LSA feature 211) may be arranged to receive an acknowledgement from a child node (e.g., node 130) to indicate that the updated link state information was received.

Processing may continue from block 1515 to decision block 1520 (Updated Info?), where the dissemination manager 105 at node 120 (e.g., via LSA feature 211) may be configured to determine whether the received acknowledgement LSA packet from its child node (e.g., node 130) included updated state information. In some examples, as mentioned above, an acknowledgement LSA packet in the format of packet format 400 may include updated or current link state information for an outgoing link of the receiving node. Processing may continue from decision block 1520 to block 1530 when the method determines that the acknowledgement included updated state information. Otherwise, processing may continue from decision block 1520 to block 1525 when the method determines that the acknowledgment does not include updated state information.

At block 1525 (Return to Decision Block 1405), the process may return to decision block 1405 of FIG. 14.

At block 1530 (Adjust Spanning Tree), the dissemination manager 105 at node 120 may be adapted to adjust spanning tree 900 (e.g., via spanning tree feature 213) based on the updated link state matrix. The adjusted spanning tree may then be at least temporarily stored in memory 101 at node 120.

Processing may continue from block 1530 to block 1535 (Acknowledge Receipt of LSA packet), where the dissemination manager 105 at node 120 (e.g., via LSA feature 211) may be configured to acknowledge receipt of the QoS state update LSA packet. In some examples, an acknowledgement LSA packet in the format of packet format 400 may be generated. Since a determination was made that the child node had forwarded its updated link state information, the acknowledgement LSA packet would contain the updated link state information received from the child node (e.g., node 130). In some examples, to prevent redundant update information from being sent to other nodes (e.g., non-parents or non-grandparents), the generated acknowledgement LSA packet may then be forwarded to node 120's spanning tree 900 parent node 160. Thus an unadjusted spanning tree 900 is used to forward the acknowledgement LSA packet.

Processing may continue from block 1535 to block 1540, (Forward QoS State Update LSA Packet), where the dissemination manager 105 at node 120 (e.g., via LSA feature 211) may be configured to forward a newly generated QoS state update LSA packet. In some examples, the newly generated QoS state update LSA packet may include the information received in the QoS state update LSA packet from node 120's parent node. The newly generated QoS state update LSA packet may also include information associated with adjustments made to spanning tree 900 by node 120 as a result of receiving updated link state information from its child node. The newly generated QoS state update LSA packet may be forwarded to node 120's spanning tree 900 children or to spanning tree children associated with a possibly adjusted spanning tree.

Processing may continue from block 1540 to block 1545 (Receive Acknowledgement), where the dissemination manager 105 at node 120 (e.g., via LSA feature 211) may be arranged to receive an acknowledgement from a child node (e.g., node 130) to indicate that the updated link state information was received.

Processing may continue from block 1545 to decision block 1550 (Updated Info?), where the dissemination manager 105 at node 120 (e.g., via LSA feature 211) may determine whether the received acknowledgement LSA packet from the child node included updated state information. Processing may continue from decision block 1550 to block 1530 when the method determines that the acknowledgement includes updated state information. Otherwise, the process may continue from decision block 1550 to block 1525 when the method determines that the acknowledgement does not include updated state information.

FIG. 16 illustrates a block diagram of an example computer program product 1600. In one embodiment, as shown in FIG. 16, computer program product 1600 includes a signal bearing medium 1602 that may also include instructions 1604. In some examples, instructions 1604 may be for disseminating link state information to one or more nodes of a network of nodes (e.g., network 100), the network of nodes interconnected via a plurality of communication channels. Instructions 1604 may be executed by logic at a node (e.g., include in a dissemination manager 105) such that the logic is to forward to the network of nodes link state information for an outgoing link of the node and receive from the network of nodes link state information for a plurality of outgoing links of the network of nodes. Instructions 1604 may also cause the logic to build a link state matrix based on the link state information for the outgoing link and also based on the link state information for the plurality of outgoing links. Also, instructions 1604 may cause the logic to generate a spanning tree based on the link state matrix. Further, instructions 1604 may cause the logic to determine whether a threshold for a quality of service (QoS) state associated with the outgoing link has been reached. Responsive to a determination of the threshold being reached, the link state matrix and the spanning tree may be updated. The updated link state information for the outgoing link may be disseminated based on the updated spanning tree. The updated link state information for the outgoing link, for example, may indicate a change in the QoS state associated with the outgoing link.

Also, as depicted in FIG. 16, some examples may include one or more of a computer readable medium 1606, a recordable medium 1608 and a communications medium 1610. The dotted boxes around these elements depict different types of mediums included within, but not limited to, signal bearing medium 1602. These types of mediums may distribute instructions 1604 to be executed by logic at a node. Computer readable medium 1606 and recordable medium 1608 may include, but are not limited to, a flexible disk, a hard disk drive (HDD), a Compact Disc (CD), a Digital Video Disk (DVD), a digital tape, a computer memory, etc. Communications medium 1610 may include, but is not limited to, a digital and/or an analog communication medium (e.g., a fiber optic cable, a waveguide, a wired communication link, a wireless communication link, etc.).

Figure 17:
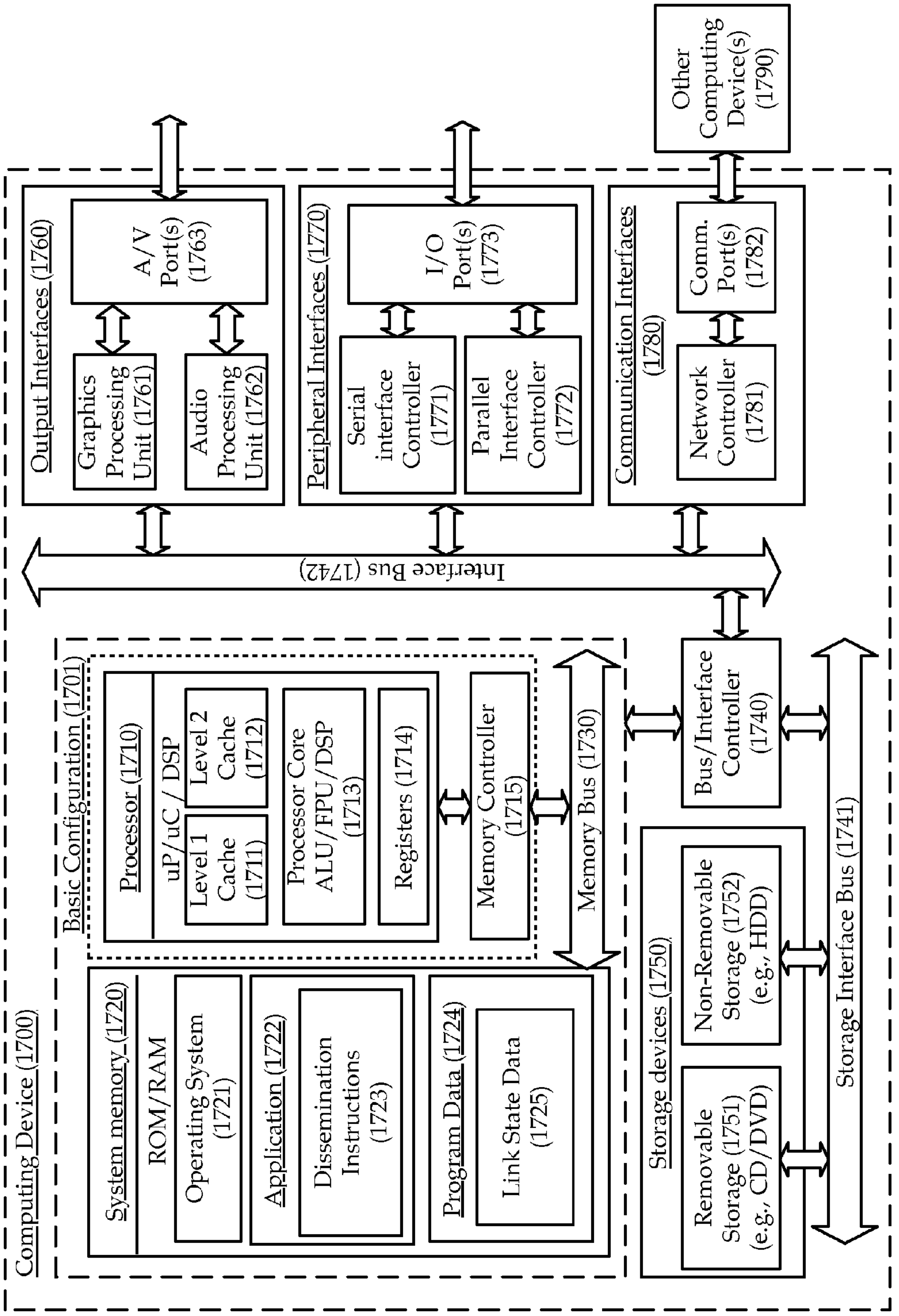
FIG. 17 illustrates an example computing device, all arranged in accordance with the present disclosure.

FIG. 17 illustrates an example computing device 1700 that is arranged for disseminating link state information to one or more nodes of a network of nodes (e.g., network 100) in accordance with the present disclosure. In a very basic configuration 1701, computing device 1700 typically includes one or more processors 1710 and system memory 1720. A memory bus 1730 can be used for communicating between the processor 1710 and the system memory 1720.

Depending on the desired configuration, processor 1710 can be of any type including but not limited to a microprocessor (μP), a microcontroller (μC), a digital signal processor (DSP), or any combination thereof. Processor 1710 can include one more levels of caching, such as a level one cache 1711 and a level two cache 1712, a processor core 1713, and registers 1714. The processor core 1713 can include an arithmetic logic unit (ALU), a floating point unit (FPU), a digital signal processing core (DSP Core), or any combination thereof. A memory controller 1715 can also be used with the processor 1710, or in some implementations the memory controller 1715 can be an internal part of the processor 1710.

Depending on the desired configuration, the system memory 1720 can be of any type including but not limited to volatile memory (such as RAM), non-volatile memory (such as ROM, flash memory, etc.) or any combination thereof. System memory 1720 typically includes an operating system 1721, one or more applications 1722, and program data 1724. Application 1722 includes dissemination instructions 1723 that are arranged to perform the functions as described herein including the actions described with respect to the functions described for the manager architecture shown in FIG. 2 or including the actions described with respect to the flow charts shown in FIGS. 14-16. Program Data 1724 includes link state data 1725 that is useful for implementing instructions 1723 (e.g., QoS states associated with outgoing links of communication channels coupling a network of nodes, building/updating a link state matrix, updating/adjusting a spanning tree, etc.). In some examples, application 1722 can be arranged to operate with program data 1724 on an operating system 1721 such that implementations of disseminating link state information to one or more nodes of a network of nodes may be provided as described herein. This described basic configuration is illustrated in FIG. 17 by those components within dashed line 1701.

Computing device 1700 can have additional features or functionality, and additional interfaces to facilitate communications between the basic configuration 1701 and any required devices and interfaces. For example, a bus/interface controller 1740 can be used to facilitate communications between the basic configuration 1701 and one or more data storage devices 1750 via a storage interface bus 1741. The data storage devices 1750 can be removable storage devices 1751, non-removable storage devices 1752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1720, removable storage 1751 and non-removable storage 1752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1700. Any such computer storage media can be part of device 1700.

Computing device 1700 can also include an interface bus 1742 for facilitating communication from various interface devices (e.g., output interfaces, peripheral interfaces, and communication interfaces) to the basic configuration 1701 via the bus/interface controller 1740. Example output interfaces 1760 include a graphics processing unit 1761 and an audio processing unit 1762, which can be configured to communicate to various external devices such as a display or speakers via one or more A/V ports 1763. Example peripheral interfaces 1760 include a serial interface controller 1771 or a parallel interface controller 1772, which can be configured to communicate with external devices such as input devices (e.g., keyboard, mouse, pen, voice input device, touch input device, etc.) or other peripheral devices (e.g., printer, scanner, etc.) via one or more I/O ports 1773. An example communication interface 1780 includes a network controller 1781, which can be arranged to facilitate communications with one or more other computing devices 1790 over a network communication via one or more communication ports 1782.

In some examples, computing devices 1790 may include all or at least a portion of the nodes of network 100 shown in FIG. 1. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., switches, input ports, input modules, central modules, output modules, output ports, computing device, etc) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method implemented by a node for disseminating link state information to one or more nodes of a network of nodes, the network of nodes interconnected via a plurality of communication channels, the method comprising:

forwarding to the network of nodes link state information for an outgoing link of the node;

receiving from the network of nodes link state information for a plurality of outgoing links of the network of nodes;

building a link state matrix based on the link state information for the outgoing link and also based on the link state information for the plurality of outgoing links;

generating a spanning tree based on the link state matrix;

determining whether a threshold for a quality of service (QoS) state associated with the outgoing link has been reached;

updating the link state matrix and updating the spanning tree in response to a determination of the threshold being reached; and disseminating updated link state information for the outgoing link based on the updated spanning tree, the updated link state information to indicate a change in the QoS state associated with the outgoing link;

determining whether one or more nodes failed to receive the updated link state information; and if it is determined that one or more nodes failed to receive the updated link state information, forwarding the updated link state information to a child of the one or more nodes via at least one outgoing link not included in the updated link state information.

2. A method according to claim 1, further comprising:

receiving an acknowledgement of receipt of the updated link state information, wherein the acknowledgement is associated with a child node, wherein the acknowledgement includes updated link state information for an outgoing link of the child node; and updating the link state matrix and updating the spanning tree based on the updated link state information for the outgoing link of the child node.

3. A method according to claim 2, wherein updating the spanning tree based on the updated link state information received from the child node comprises generating another spanning tree.

4. A method according to claim 1, wherein updating the spanning tree in response to the determination of the threshold being reached comprises generating another spanning tree.

5. A method according to claim 1, wherein determining whether the threshold for the QoS state associated with the outgoing link comprises determining whether the threshold has been reached responsive to a minimum time threshold being reached.

6. A method according to claim 1, wherein the QoS state associated with the outgoing link comprises an indication of whether data forwarded from the node via the outgoing link has an ability to meet a class of service associated with a QoS parameter.

7. A method according to claim 6, wherein the QoS parameter comprises one or more of delay, available bandwidth, packet loss and/or security requirement.

8. A method according to claim 6, wherein the QoS parameter is associated with a weight value, wherein the spanning tree is updated based on the weight value and the class of service associated with the QoS parameter.

9. A method implemented by a node for disseminating link state information to one or more nodes of a network of nodes, the network of nodes interconnected via a plurality of communication channels, the method comprising:

receiving link state information from a parent node;

determining whether current link state information for an outgoing link of the node indicates that a threshold for a quality of service (QoS) state associated with the outgoing link has been reached;

in response to a determination that the current link state information indicates that the threshold has been reached, updating a link state matrix based on the received link state information from the parent node and also based on the current link state information;

adjusting a spanning tree based on the updated link state matrix, wherein the adjusted spanning tree is used to forward the current link state information and the updated link state information received from the parent node, the information forwarded to a child node via the outgoing link of the node; and sending a fail indication to the parent node based on failing to receive an acknowledgement from the child node of the child node receiving the updated link state information and the current link state information for the outgoing link of the node, the fail indication to include the current link state information, wherein the current link state information is to be forwarded by the parent node to the node's child node via at least one outgoing link not included in the adjusted spanning tree.

10. A method according to claim 9, further comprising:

sending to the parent node an acknowledgement of receipt of the updated link state information, the acknowledgement to include the current link state information for the outgoing link of the node, wherein the acknowledgement is sent to the parent node using the unadjusted spanning tree.

11. A method according to claim 9, further comprising:

receiving an acknowledgement of receipt of the current link state information for the outgoing link of the node and the updated link state information received from the parent node, the acknowledgement received from the child node, wherein the acknowledgement includes current link state information for an outgoing link of the child node; and updating the link state matrix and updating the adjusted spanning tree based on the received current link state information for the outgoing link of the child node.

12. A method according to claim 9, wherein failing to receive the acknowledgement from the child node, comprises failing to receive the acknowledgement within a predetermined time interval.

13. A method according to claim 9, wherein the QoS state associated with the outgoing link of the node comprises an indication of whether data forwarded from the node via the outgoing link has an ability to meet a class of service associated with a QoS parameter, the QoS parameter comprising one or more of delay, available bandwidth, packet loss and/or security requirement.

14. A method according to claim 13, wherein the QoS parameter is associated with a weight value, wherein the spanning tree is adjusted based on the weight value and the class of service associated with the QoS parameter.

15. An apparatus to disseminate link state information to one or more nodes of a network of nodes, the network of nodes interconnected via a plurality of communication channels, the apparatus comprising:

a dissemination manager at a node, the dissemination manager including logic configured to:

forward to the network of nodes link state information for an outgoing link of the node;

receive from the network of nodes link state information for a plurality of outgoing links of the network of nodes;

build a link state matrix based on the link state information for the outgoing link and also based on the link state information for the plurality of outgoing links;

generate a spanning tree based on the link state matrix;

determine whether a threshold for a quality of service (QoS) state associated with the outgoing link has been reached;

update the link state matrix and update the spanning tree in response to a determination of the threshold being reached; and disseminate the updated link state information for the outgoing link based on the updated spanning tree, the updated link state information to indicate a change in the QoS state associated with the outgoing link;

determining whether one or more nodes failed to receive the updated link state information; and if it is determined that one or more nodes failed to receive the updated link state information, forwarding the updated link state information to a child of the one or more nodes via at least one outgoing link not included in the updated link state information.

16. An apparatus according to claim 15, wherein the QoS state associated with the outgoing link of the node comprises an indication of whether data forwarded from the node via the outgoing link has an ability to meet a class of service associated with a QoS parameter including one or more of delay, available bandwidth, packet loss and/or security requirement.

17. An apparatus according to claim 16, wherein the QoS parameter is associated with a weight value, wherein the spanning tree is updated based on the weight value and the class of service associated with the QoS parameter.

18. A system for disseminating link state information to one or more nodes of a network of nodes, the network of nodes interconnected via a plurality of communication channels, the system comprising:

a memory resident on a node to store a link state matrix and a spanning tree;

a dissemination manager for the node, the dissemination manager having logic configured to:

receive link state information from a parent node;

determine whether current link state information for an outgoing link of the node indicates that a threshold for a quality of service (QoS) state associated with the outgoing link has been reached;

in response to a determination that the current link state information indicates that the threshold has been reached, update the link state matrix stored in the memory based on the received link state information from the parent node and also based on the current link state information;

adjust the spanning tree stored in the memory based on the updated link state matrix;

forward the current link state information and the updated link state information received from the parent node based on the adjusted spanning tree, the information forwarded to a child node; and sending a fail indication to the parent node based on failing to receive an acknowledgement from the child node of the child node receiving the updated link state information and the current link state information for the outgoing link of the node, the fail indication to include the current link state information, wherein the current link state information is to be forwarded by the parent node to the node's child node via at least one outgoing link not included in the adjusted spanning tree.

19. A system according to claim 18, wherein the QoS state associated with the outgoing link of the node, comprises an indication of whether data forwarded from the node via the outgoing link has an ability to meet a class of service associated with a QoS parameter, the QoS parameter comprising one or more of delay, available bandwidth, packet loss and/or security requirement.

20. A system according to claim 19, wherein the QoS parameter is associated with a weight value, wherein the dissemination manager logic is further configured to adjust the spanning tree based on the weight value and the class of service associated with the QoS parameter.

21. A computer program product comprising a machine-readable non-transitory medium having instructions for disseminating link state information to one or more nodes of a network of nodes, the network of nodes interconnected via a plurality of communication channels, the instructions, which, when executed by logic at a node, cause the logic to:

forward to the network of nodes link state information for an outgoing link of the node;

receive from the network of nodes link state information for a plurality of outgoing links of the network of nodes;

build a link state matrix based on the link state information for the outgoing link and also based on the link state information for the plurality of outgoing links;

generate a spanning tree based on the link state matrix;

determine whether a threshold for a quality of service (QoS) state associated with the outgoing link has been reached;

update the link state matrix and update the spanning tree in response to a determination of the threshold being reached; and disseminate updated link state information for the outgoing link based on the updated spanning tree, the updated link state information to indicate a change in the QoS state associated with the outgoing link;

determining whether one or more nodes failed to receive the updated link state information; and if it is determined that one or more nodes failed to receive the updated link state information, forwarding the updated link state information to a child of the one or more nodes via at least one outgoing link not included in the updated link state information.

22. A computer program product according to claim 21, wherein the QoS state associated with the outgoing link of the node, comprises an indication of whether data forwarded from the node via the outgoing link has an ability to meet a class of service associated with a QoS parameter comprising one or more of delay, available bandwidth, packet loss and/or security requirement.

23. A computer program product according to claim 22, wherein the QoS parameter is associated with a weight value, wherein the spanning tree is updated based on the weight value and the class of service associated with the QoS parameter.

* * * * *

UNITED STATES PATENT AND TRADEMARK OFFICE
CERTIFICATE OF CORRECTION

PATENT NO. : 8,385,231 B2
APPLICATION NO. : 12/512635
DATED : February 26, 2013
INVENTOR(S) : Rojas-Cessa et al.

It is certified that error appears in the above-identified patent and that said Letters Patent is hereby corrected as shown below:

On the Title Page, in Item (56), under "OTHER PUBLICATIONS", in Column 2, Line 6, delete "Verson" and insert -- Version --, therefor.

On the Title Page, in Item (56), under "OTHER PUBLICATIONS", in Column 2, Line 10, delete "28" and insert -- 28, --, therefor.

In the Drawings:

In Fig. 16, Sheet 15 of 16, in Line 10, delete "the the network" and insert -- the network --, therefor.

In Fig. 17, Sheet 16 of 16, below Tag "1710", in Line 1, delete "uP / uC / DSP" and insert -- μP / μC / DSP --, therefor.

In the Specifications:

In Column 1, Line 3, above "BACKGROUND", insert -- STATEMENT REGARDING FEDERALLY SPONSORED RESEARCH OR DEVELOPMENT
This work was supported in part by National Science Foundation grant number CNS-0435250. --.

In Column 22, Line 35, delete "(HDD)," and insert -- (HDDs), --.

In Column 22, Line 37, delete "(SSD)," and insert -- (SSDs), --.

In the Claims:

In Column 25, Line 22, in Claim 1, delete "reached; and" and insert -- reached; --, therefor.

In Column 28, Line 40, in Claim 21, delete "reached; and" and insert -- reached; --, therefor.

Signed and Sealed this
Sixteenth Day of July, 2013

Teresa Stanek Rea
*Acting Director of the United States Patent and Trademark Office*